(12) United States Patent
Shull et al.

(10) Patent No.: US 9,923,882 B2
(45) Date of Patent: Mar. 20, 2018

(54) DOMAIN BASED AUTHENTICATION SCHEME

(71) Applicants: Mark Kevin Shull, Palo Alto, CA (US); John Francis Mergen, Baltimore, MD (US)

(72) Inventors: Mark Kevin Shull, Palo Alto, CA (US); John Francis Mergen, Baltimore, MD (US)

( * ) Notice: Subject to any disclaimer, the term of this patent is extended or adjusted under 35 U.S.C. 154(b) by 613 days.

(21) Appl. No.: 14/149,094

(22) Filed: Jan. 7, 2014

(65) Prior Publication Data

US 2014/0123264 A1 May 1, 2014

Related U.S. Application Data

(60) Division of application No. 13/205,476, filed on Aug. 8, 2011, now abandoned, which is a continuation of application No. 12/622,925, filed on Nov. 20, 2009, now Pat. No. 8,024,777.

(60) Provisional application No. 61/116,604, filed on Nov. 20, 2008.

(51) Int. Cl.
*H04L 29/06* (2006.01)
*H04L 29/08* (2006.01)

(52) U.S. Cl.
CPC ............. *H04L 63/08* (2013.01); *H04L 67/02* (2013.01)

(58) Field of Classification Search
CPC combination set(s) only.
See application file for complete search history.

(56) References Cited

U.S. PATENT DOCUMENTS

| | | | |
|---|---|---|---|
| 6,219,676 B1 * | 4/2001 | Reiner | H04L 67/2852 |
| 6,366,947 B1 * | 4/2002 | Kavner | G06F 17/30902 |
| | | | 707/E17.12 |
| 6,993,209 B1 * | 1/2006 | Schowtka | G06T 11/60 |
| | | | 382/298 |
| 7,287,279 B2 * | 10/2007 | Bertman | G06F 21/563 |
| | | | 382/103 |
| 7,493,403 B2 | 2/2009 | Shull | |
| 7,634,810 B2 * | 12/2009 | Goodman | H04L 63/1483 |
| | | | 726/22 |
| 8,024,777 B2 | 9/2011 | Shull | |
| 8,356,333 B2 * | 1/2013 | Kramer | G06F 21/6218 |
| | | | 726/2 |

(Continued)

FOREIGN PATENT DOCUMENTS

| WO | 2007/030764 A2 | 3/2007 |
|---|---|---|
| WO | WO2007037524 | * 4/2007 |

OTHER PUBLICATIONS

Yuan (Yuan et al., "DoX: A Peer-to-Peer Antidote for DNS Cache Poisoning Attacks", IEEE 1-4244-0355-3/06, 2006).*

(Continued)

*Primary Examiner* — Peter Poltorak
(74) *Attorney, Agent, or Firm* — Schwabe Williamson & Wyatt, PC

(57) ABSTRACT

In one example, a system for authenticating domains operates by authenticating a first domain and the extensions that make up the URI of an initial or primary Internet network call. Thereafter, the system can enable the owner of the first domain to make assertions or statements about additional domains and URIs that make up the rest of the web page, session or application.

18 Claims, 24 Drawing Sheets

(56) References Cited

U.S. PATENT DOCUMENTS

| | | | | |
|---|---|---|---|---|
| 8,484,377 | B1* | 7/2013 | Chen | H04L 61/1511 709/245 |
| 8,584,234 | B1* | 11/2013 | Sobel | H04L 67/2852 726/22 |
| 9,300,623 | B1* | 3/2016 | Earl | H04L 61/1511 |
| 2002/0065936 | A1* | 5/2002 | Schiuma | H04L 29/06 709/238 |
| 2004/0078487 | A1* | 4/2004 | Cernohous | H04L 29/12009 709/245 |
| 2006/0021019 | A1 | 1/2006 | Hinton | |
| 2006/0092861 | A1* | 5/2006 | Corday | H04L 41/0213 370/256 |
| 2006/0095955 | A1* | 5/2006 | Vong | H04L 63/101 726/3 |
| 2006/0143711 | A1* | 6/2006 | Huang | H04L 63/1416 726/23 |
| 2007/0192855 | A1* | 8/2007 | Hulten | G06F 17/30887 726/22 |
| 2007/0220575 | A1 | 9/2007 | Cooper | |
| 2007/0240108 | A1* | 10/2007 | Dorn | G06F 9/5072 717/114 |
| 2008/0060054 | A1* | 3/2008 | Srivastava | H04L 29/12066 726/2 |
| 2008/0109657 | A1* | 5/2008 | Bajaj | H04L 9/3213 713/168 |
| 2008/0147837 | A1* | 6/2008 | Klein | H04L 29/12066 709/223 |
| 2008/0177994 | A1* | 7/2008 | Mayer | G06F 9/4418 713/2 |
| 2008/0215675 | A1 | 9/2008 | Kaminitz | |
| 2009/0089426 | A1* | 4/2009 | Yamasaki | H04L 29/12066 709/225 |
| 2009/0132713 | A1 | 5/2009 | Dutta | |
| 2009/0248883 | A1 | 10/2009 | Suryanarayana | |
| 2009/0254745 | A1 | 10/2009 | Ganesan | |
| 2009/0320105 | A1 | 12/2009 | Jurkiewicz | |
| 2010/0082989 | A1 | 4/2010 | Bussard | |
| 2010/0083359 | A1 | 4/2010 | Readshaw | |
| 2010/0088761 | A1* | 4/2010 | Podjarny | G06F 21/00 726/22 |
| 2010/0121981 | A1* | 5/2010 | Drako | G06F 15/173 709/245 |
| 2010/0125895 | A1 | 5/2010 | Shull | |
| 2010/0262688 | A1* | 10/2010 | Hussain | H04L 63/1433 709/224 |
| 2011/0153807 | A1* | 6/2011 | Vicisano | H04L 29/12066 709/224 |
| 2011/0296503 | A1 | 12/2011 | Shull | |
| 2011/0321139 | A1* | 12/2011 | Jayaraman | G06F 21/51 726/4 |
| 2013/0173825 | A1* | 7/2013 | McPherson | H04L 61/1511 709/245 |
| 2014/0082172 | A1* | 3/2014 | Chueh | H04L 61/1511 709/223 |

OTHER PUBLICATIONS

Ju (Ju et al., "Cache Poisoning Detection Method for Imroving Security of Recursive DNS", ISBN 978-89-58519-131-8 93560, Feb. 2007 ICACT 2007).*

Anderson (Ben Anderson, Why Web Browser DNS Caching Can Be a Bad Thing, found at http://dyn.com/blog/web-browser-dns-caching-bad-thing, Sep. 2011).*

Markham, Gervase, "Improving Authentication on the Internet (Version 0.4)," http://www.gerv.net/security/improving-authentication/; May 12, 2005; 11 pages.

Barth, et al., "Securing Frame Communication in Browsers," Publication date is at least as early as Apr. 1, 2008; 14 pages.

Stolowitz Ford Cowger LLP; Listing of Related Cases; Dec. 11, 2013; 1 page.

Rigney, "RADIUS Accounting" RFC 2866; The Internet Society (2000); retrieved from the Internet at <https://tools.ietf.org/html/rfc2866>; 28 pages.

GeoTrust, Inc. (2007) Extended Validation SSL and Customer Confidence (White Paper); 9 pages.

Allman, "DomainKeys Identified Mail (DKIM): Introduction and Overview"; Sendmail, Inc.; published Mar. 13, 2008; retrieved from the Internet at <http://www.dkim.org/info/DKIM-Intro-Allman.pdf>; 10 pages.

Sharma; "Prevent a cross-site scripting attack, First Step: recognize the signs and halt an XSS intrusion"; IBM dated Feb. 3, 2004; 7 pages.

"The Cross-Site Scripting (XSS) FAQ"; cgisecurity.com; published to the public May 2002; retrieved from the Internet at <http://www.cgisecurity.com/xss-faq.html>; 7 pages.

"Access Control for Cross-Site Requests" W3C Working Draft Sep. 12, 2008; retrieved from the Internet at <http://www.w3.org/TR/2008/WD-access-control-20080912/>; 14 pages.

Arends, et al., "DNS Security Introduction and Requirements" RFC 4033; The Internet Society (2005); retrieved from The Internet at <https://www.ietf.org/rfc/rfc4033.txt>: 19 pages.

Schneider, "Fresh Phish" IEEE Spectrum; posted Oct. 1, 2008; retrieved from the Internet at https://spectrum.ieee.org/computing/software/fresh-pish>; 4 pages.

Black Ops 2008: It's the End of the Cache As We Know It or: "64K Should Be Good Enough for Anyone" by Dan Kaminsky, Director of Penetration Testing, IOActive, Inc.; 101 pages.

\* cited by examiner

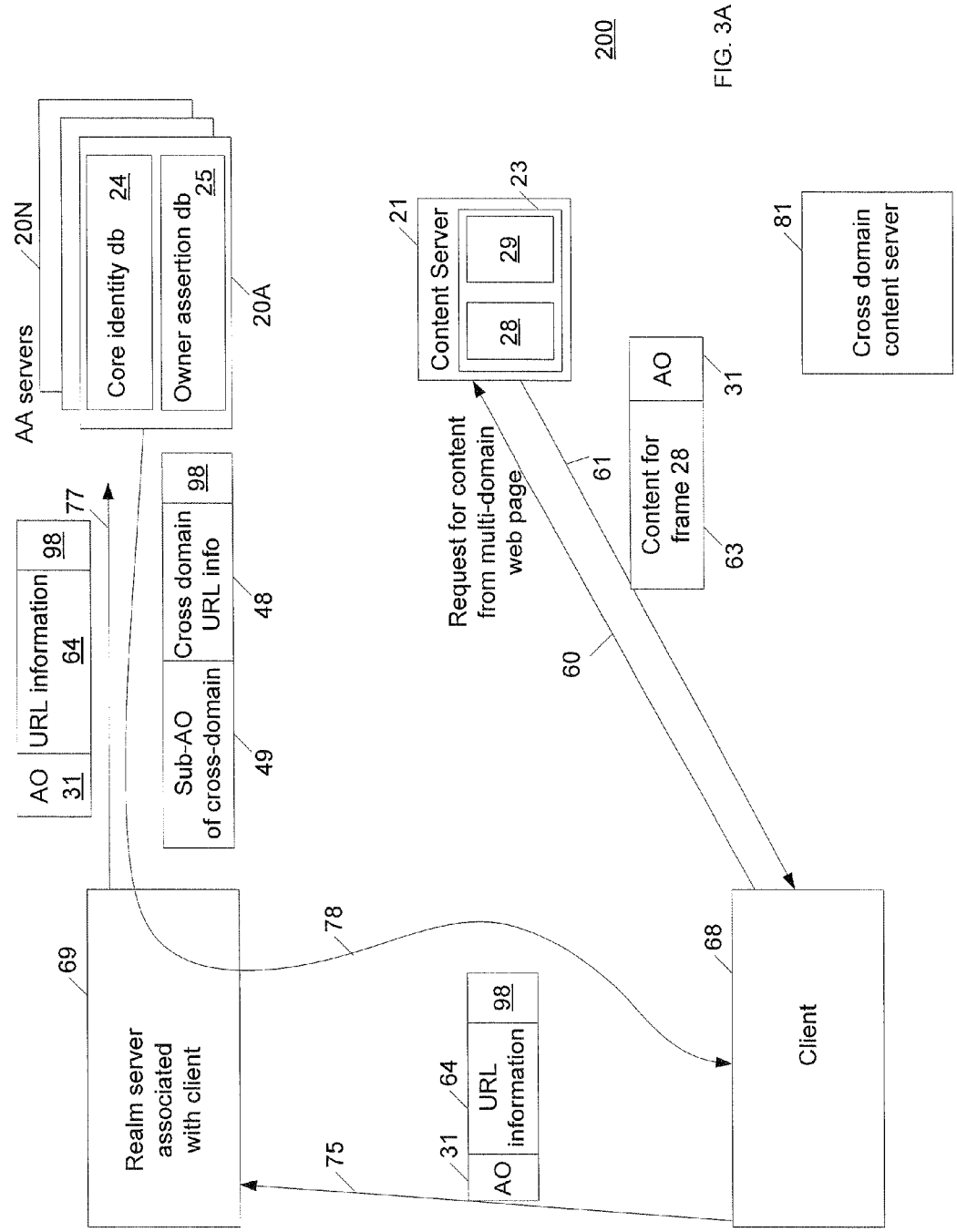

Authenticated Domains Elements

Implementation Elements Using RADIUS

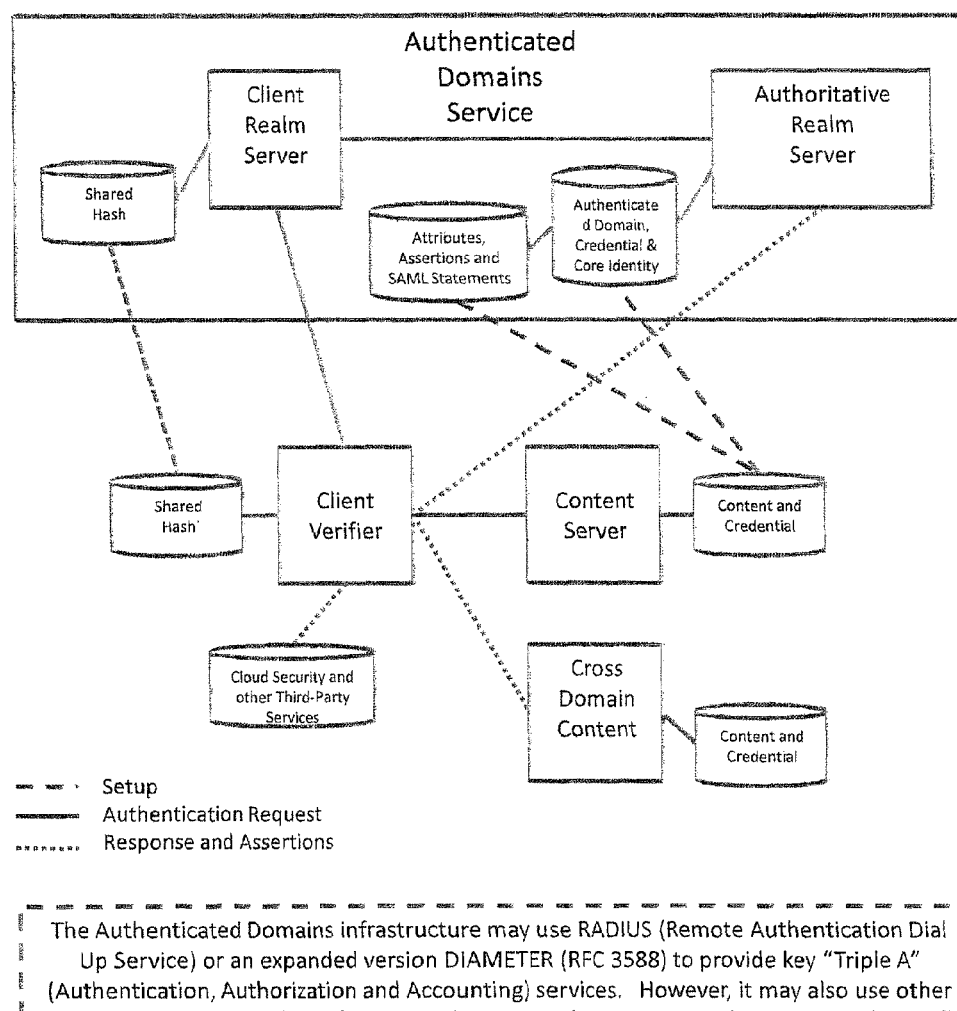

- - - Setup
— Authentication Request
⋯ Response and Assertions

The Authenticated Domains infrastructure may use RADIUS (Remote Authentication Dial Up Service) or an expanded version DIAMETER (RFC 3588) to provide key "Triple A" (Authentication, Authorization and Accounting) services. However, it may also use other authentication standards, such as SAML (Secure Authentication Markup Language) as well. These and other authentication services may be used combination.

FIG 8

DOMAIN BASED AUTHENTICATION SCHEME

RELATED APPLICATIONS

This application is a divisional of U.S. patent application Ser. No. 13/205,476, filed Aug. 8, 2011 which is a continuation of U.S. patent application Ser. No. 12/622,925, filed on Nov. 20, 2009, now issued as U.S. Pat. No. 8,024,777 on Sep. 20, 2011, which claims the benefit of U.S. Provisional Patent Application No. 61/116,604, filed on Nov. 20, 2008, each of which are herein incorporated by reference in their entirety for all purposes.

BACKGROUND OF THE INVENTION

Some existing authentication schemes for web pages rely on Certificate Authority (CA) digital certificates. In these schemes, a CA digital certificate is installed on a server that stores content for a transaction page, such as a home page for a domain. When a client such as a browser attempts to access the transaction page, the CA digital certificate is accessed by the client. The CA digital certificate represents a vouching by the CA (a trusted third party to the transaction between the client and the server) that the content being provided to the client is originating from a server that matches ownership records for the accessed URL.

Some web pages draw content from multiple different servers through a technology such as framing or native browser functionality (native browser functionality is enabled by browser cross domain request objects). In a multi-frame web page, content is pulled together from a plurality of sources with a different network call being used for each source (multi-origin call). For example, a controlling frame of the transaction page discussed above can draw content from one particular server operated by an owner of the domain while another frame of the same transaction page can draw content from another particular server operated by the owner of the domain or a server operated by a separate owner. When such a web page loads correctly, the image appears as a single web page even though the content is assembled from the plurality of servers.

When a client attempts to access a web page linked to a plurality of content servers using the scheme described in the first paragraph, only a portion of the web page will be loaded, or all of the web page will be loaded with only some of the content sources being authenticated, either of which represents a problem with the authentication process. In one case, the resulting image is incomplete, while in the other case a portion of the servers providing the data to the client are unauthenticated, presenting a security hole. The disclosure that follows solves this and other problems.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one example, a system for authenticating domains operates by authenticating a first domain and the extensions that make up the URI of an initial or primary Internet network call. Thereafter, the system can enable the owner of the first domain to make assertions or statements about additional domains and URIs that make up the rest of the web page, session or application. Additional aspects and advantages of this invention will be apparent from the following detailed description of preferred embodiments, which proceeds with reference to the accompanying drawings.

BRIEF DESCRIPTION OF THE DRAWINGS

FIGS. 3A-B illustrate one example of a client using the authentication server subsequent to the setup configuration of FIG. 2 in a multi-domain authentication process.

FIGS. 7-22 illustrate another example of a domain based authentication system.

DETAILED DESCRIPTION OF PREFERRED EMBODIMENTS

Figure 1:
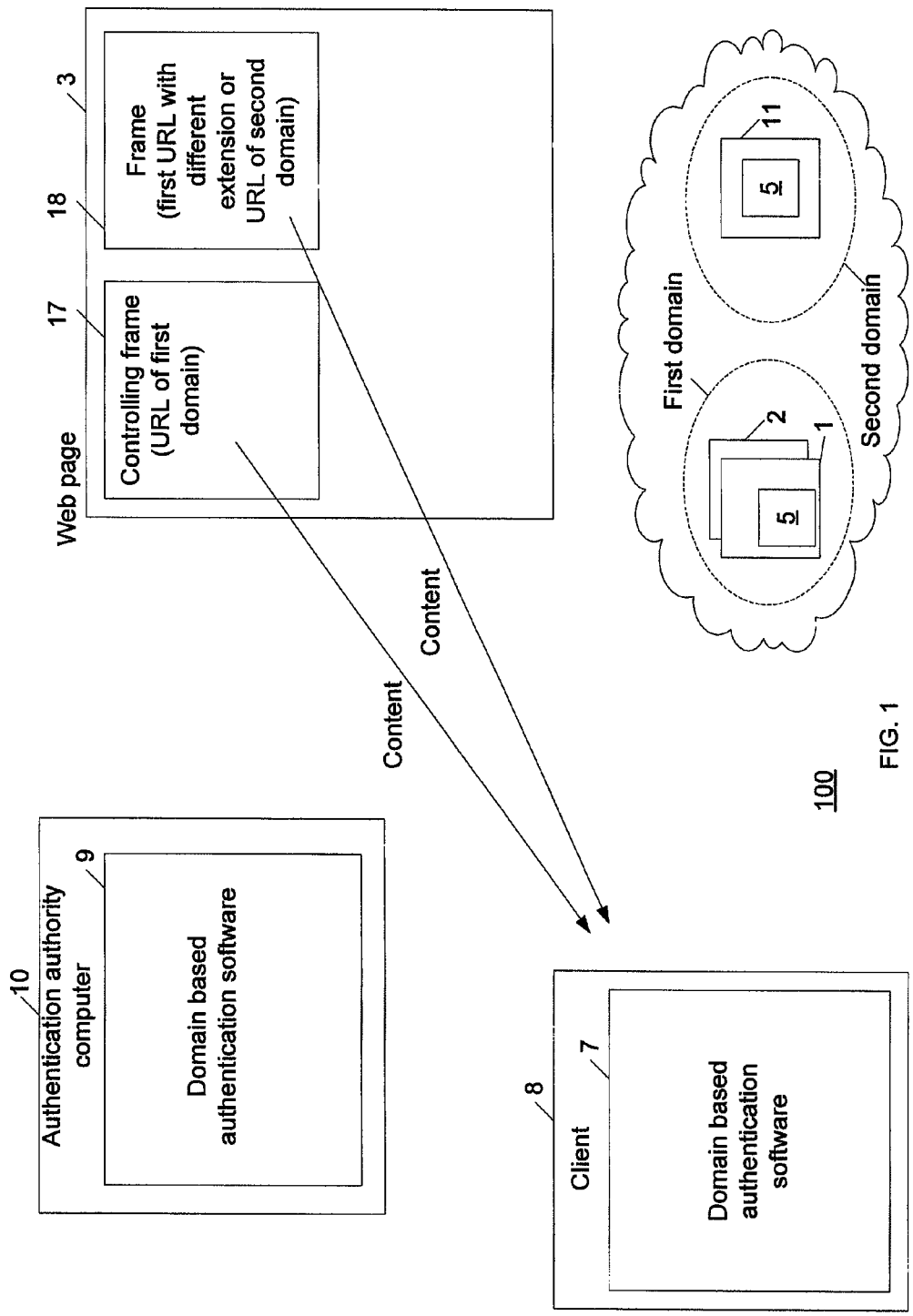
FIG. 1 illustrates a domain based authentication system.

Overview of the Application Before Referring to the Figures

Authenticated Domains is an Internet based system to authenticate identity and use rights for groups of interacting domains, such that they may be operated on as fused aggregations across diverse origins, sequences, protocols, applications or devices.

In one implementation, Authenticated Domains can authenticate a browser session from the first page to the last, across both HTTP and HTTPS protocols, as one. In another implementation, Authenticated Domains can enable a controlling frame in a web page to vouch for the other network calls that make up the rest of the web page (to address a problem with Certificate Authority certificates where only the controlling frame is authenticated and other network calls on the web page are not.) In yet another implementation, Authenticated Domains can authenticate a multi-application, multi-protocol and multi-origin series of domain and URI based network calls, such as an email, that includes advertisers and links to the email sender's web site, in a fused group as one.

Authenticated Domains operates by authenticating the domain and the extensions that make up the URI of an initial or primary Internet network call, and then enabling the initial or primary domain (in the URI), once authenticated, to make assertions or statements about additional domains and URIs that make up the rest of the web page, session or application. Authenticated Domains enables stateful, persistent and portable management of fused aggregations of Authenticated Domains, individually or as groups, because their core identity, and associated trust and use rights are normalized with respect to each other.

Authenticated Domains validates the ownership of a domain name using methods similar to how a Certificate Authority (CA) validates the ownership of certificate, but to uniform and normalized standards in all cases. The domain and the validated ownership data, a core identity, are bound together and made available via a secure lookup service in the Internet. When an end user receives content called from an Authenticated Domain, a Client Verifier in the end user's system or browser detects the Authenticated Domain and performs a secure and independent lookup to the Authenticated Domains Service in the Internet to obtain the verified core identity of the domain, as well as attributes and assertions bound to the domain, and to verify that DNS is accurate for the network calls involved.

There are multiple categories or levels of Authenticated Domains. Higher-level Authenticated Domains must meet more rigorous ownership validation standards, but they also gain higher-level trust and use rights, such as vouching, fusing and ecommerce, which are in the form of assertions or statements bound to the Authenticated Domain. One of the validation standards may be equal to the Extended Validation (EV) standard recently developed for EV CA certificates. Authenticated Domains defines and enforces these trust and use rights, depending on the validation level and authenticated domain category, within the system, such that a lower-level Authenticated Domain cannot be substituted for a higher-level Authenticated Domain.

In addition to defining trust and use rights for each category or level of Authenticated Domain, trust and use rights between categories or levels of Authenticated domains are also defined and system enforced.

Authenticated Domains may supplement or replace Certificate Authority (CA) certificates. Unlike CA certificates, Authenticated Domains provide near universal authentication coverage for all domain and URI based network calls in the Internet, regardless of protocol, application or device. Also, unlike CA certificates, domain ownership validation is performed to uniform standards in all cases with corresponding system enforced trust and use rights, and Authenticated Domains operate in uniform and normalized ways as groups, across protocols, applications, time dimensions and devices. In some implementations, an Authenticated Domain may be bound to a standard digital certificate to create a synthetic equivalent of a CA certificate.

Authenticated Domains also enable browsers to expand EV-type services, from just EV CA certificate web pages, to all web pages, and to make these services persistent and stateful across domains, sessions and applications.

Authenticated Domains contain key computing properties, such as being unique, normalized with respect to trust and use, generalized across any Internet protocol, application or device, atomic such that they can be used in any combination, sequence or function without transforming, persistent with respect to owner identity and assertions, and revocable. As such, they are designed to be consumed programmatically by external applications and services, including security, directory, monitoring, access control, state, logging, ecommerce, publishing, advertising, rights management, transaction, and other services.

Authenticated Domains include one or more means to ensure DNS accuracy for all network calls. It does this through a combination of existing and new DNS authentication services, a trusted DNS service and an independent DNS Client Verifier.

In one implementation, the Client Verifier may be installed as a signed application on the end user's client device, or in another it may be a "clientless" browser application that is downloaded as needed. In one implementation malware security and other services may be added to the Client Verifier to verify that the end user is who they say they are, that the browser is safe and that the end user has appropriate access permissions.

In one implementation, the Authenticated Domains service may be configured using SAML federation, such that the end user may perform a SAML log-in to the Authentication Authority, which in turn acts as a SAML Identity Provider to create a SAML federation between the end user's Client Verifier and the Authoritative Authentication Servers (but not the end user itself). In such cases, the external applications and services applications that consume Authenticated Domains results may be cloud services that are federated with the Authenticated Domain sessions.

In certain implementations, Authenticated Domains may be implemented via new and unique combinations of services that make up Internet Certificate Authority, Extended Validation Certificates, Domain Name Server (DNS), Remote Authentication Dial-In User Service (RADIUS) or DIAMETER authentication and Security Assertion Markup Language (SAML) authentication services.

FIG. 1 illustrates a domain based authentication system.

The system 100 includes software 7 operating on a client 8 having as a browser or email application and software 9 operating on an authentication authority computer 10. The software 7 and 9 interoperate to authenticate one or more domains in response to the client 8 accessing a web resource of the domain. The system 100 can include other software operating on other devices, such as software 5 operating on some or all of the content servers 1, 2, and 11, to communicate with the software 7 and 9 to facilitate the domain based authentication.

One benefit of the above-described domain based authentication is apparent when considering network resources that utilize framing or native browser functionality. These technologies allow a client to display content from a plurality of servers on a single document, such as the example web page 3, an email, or any other document. The example web page 3 contains a controlling frame 17 to display content stored on a server 1 of a first domain. The controlling frame 17 is the frame of the web page 3 that displays the content of the accessed URL. The web page 3 has additional frame 18 to display content from either a different server 2 of the first domain or a server 11 of a second different domain. In either case, an additional frame 18 display can be associated with a different URL, for example, a URL of the same domain but with a different extension or a URL of a different domain. When the web page 3 is displayed, there will be included thereon content from a plurality of servers (whether those servers include 1 and 2, or 1 and 11, or 1, 2, and 11).

The authentication software 7 and 9 performs a domain based authentication process in conjunction with the client accessing the URL of the web page 3. Thus, it should be understood that the authentication is not limited to a specific server for which a certificate is installed thereon. The authentication of the first domain applies to all of the servers of the first domain (servers 1 and 2).

Similarly, the domain based authentication process can include authentication of a plurality of domains. For example, when the additional frame 18 displays content from the server 11 of the second domain, the second domain can be authenticated during the authentication process.

Figure 2:
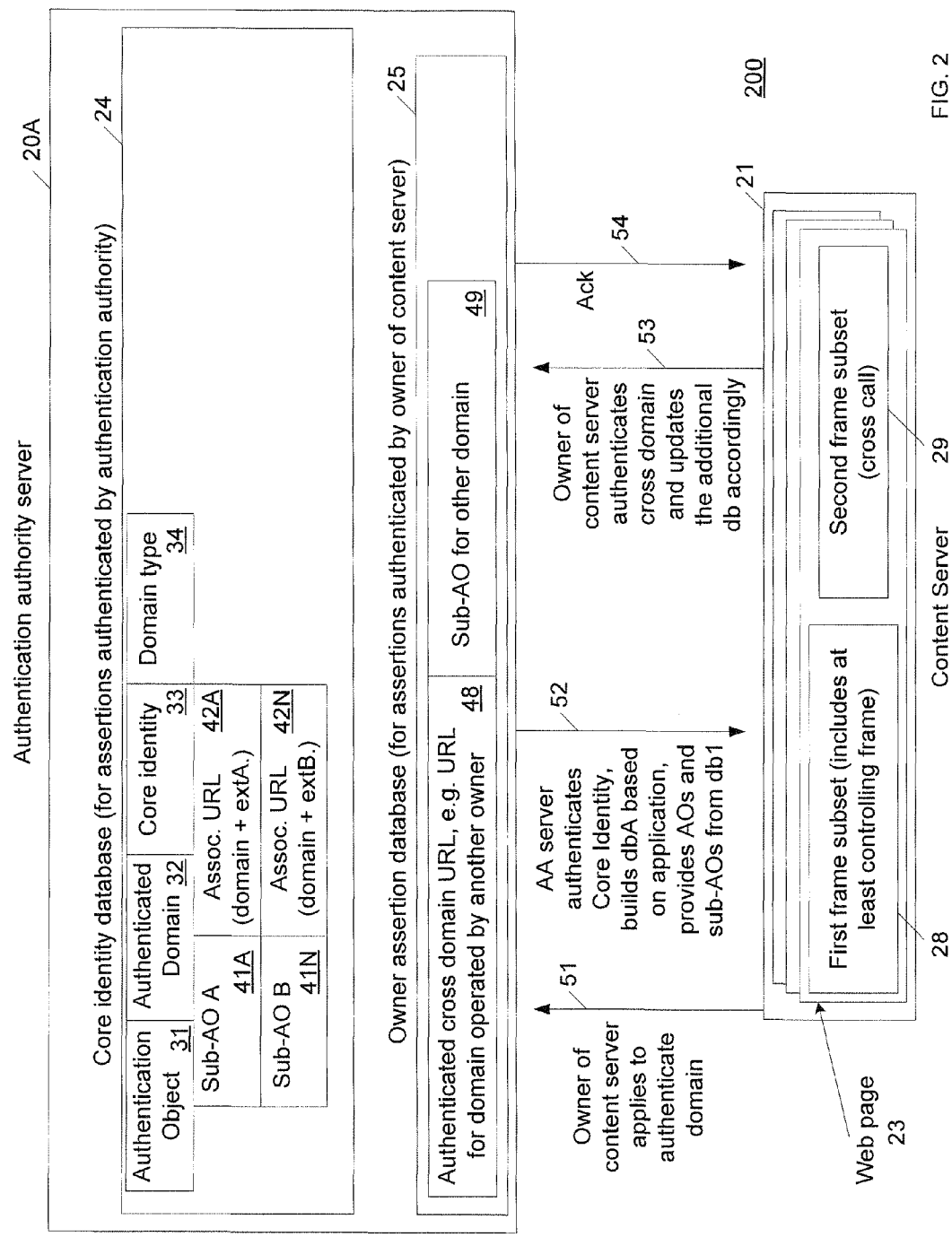
FIG. 2 illustrates a setup configuration process in one example of an authentication server that utilizes principles described with reference to FIG. 1.

FIG. 2 illustrates a setup configuration process in one example of an authentication server that utilizes principles described with reference to FIG. 1.

The system 200 is a particular example of an authentication authority server 20A that utilizes the principles of domain based authentication as described in FIG. 1. In the particular example described below, the system 200 configures the authentication authority (AA) server 20A to perform an authentication for a cross domain call, which occurs when a web page draws content from a plurality of different domains. It should be apparent that other examples can utilize domain based authentication without necessarily authenticating for a cross domain call (such as a multi-origin call within a single domain).

In this example, an owner controls a content server 21 for a first domain with at least one web page 23. The web page 23 is a multi-frame web page 23 with a first subset (one or more) of frames 28 to display content of the first domain. The first subset 28 includes at least a controlling frame corresponding to the URL of the web page 23, and may also include other frames corresponding to other particular URLs to be called for displaying the web page 23. The web page 23 also includes a second subset 29 (one or more) of frames to display content of a second domain. The second domain may be under control of a different owner, such as a business affiliate of the owner.

In process 51, an owner of a domain 32 applies with the AA server 20A to register that first domain 32 with the AA. In response, the AA server 20A formats an entry in a core identity database 24 for the owner. The entry in the database 24 binds the first domain 32 with a particular Authentication Object (AO) 31, a core identity 33 for the owner, and in some examples, a domain type 34. The AO 31 can contain credentials, realm data, pathID, digital certification or other provenance items to provide the identity of the corresponding domain.

The domain type 34 represents a validation category of the first domain 32. If the first domain 32 is listed as a higher level, then the first domain 32 will be authenticated using a more rigorous ownership validation standard in process 51. One example of such a fixed owner validation standard used for authentication is the Extended Validation (EV) standard recently developed for EV CA certificates. Authenticated Domains defines and enforces these trust and use rights, depending on the validation level and authenticated domain category, within the system, such that a lower-level Authenticated Domain cannot be substituted for a higher-level Authenticated Domain. Validation standards for other types can be more rigorous or less rigorous than the EV standard. In any case, the validation standard used for one domain of a particular type is the same validation standard used for all other domains of that particular type. Therefore, the validation for any particular domain proceeds according to the fixed standards set for the domain type to which the particular domain corresponds in the domain type field 34 (this can be contrasted with prior systems that used ad hoc validation standards on a per-server basis). In the system 200, all domains are validated to a respective one of a defined plurality of fixed standards as specified by the domain type field 34.

The domain type 34 also indicates the trust and use rights, where a higher level type gains additional trust and use rights not available to lower level types. Examples of the trust and use rights provided to a higher level domain type are vouching, fusing and ecommerce, which are in the form of assertions or statements in the owner assertion database 25. A domain of a particular level can vouch for domains of that particular level or less, but not for domains of a higher level. As will be explained later in more detail, a second domain vouched for by the first domain will be treated as fused with the first domain by consuming client applications and services. In addition to defining trust and use rights for each category or level of Authenticated Domain, trust and use rights between categories or levels of Authenticated domains are also defined and system enforced.

The owner can also register particular Uniform Resource Identifiers (URIs) of the domain (such as a particular Uniform Resource Locator (URL) as shown in the FIG. 2, where the particular URL is the domain 32 plus a particular extension) with the AA. Each registered particular URI is associated with a particular sub-AO 41A-N. These sub-AOs 41A-N can correspond to other web pages of the domain, for example, other web pages besides the web page 23, or to the same web page 23 but a different one of the first subset 28 of frames. The sub-AOs 41A-N can contain credentials, realm data, path ID, digital certification or other provenance items to provide the identity of the corresponding particular URI.

For each particular URI provided to the AA server in process 51, the AA server 20A formats a sub-entry in the database 24 to associate the particular URL 42 A-N with a particular one of the sub-AO 41A-N. These sub-entries are bound to the same core identity 33 in the core identity database 24. The sub-AO 41A-N can be used to uniquely identify any network call to the domain. In process 52, the AA server 20A provides the AO 31 and sub-AOs 41A-N from the database 24 to the content server 21.

In process 53, which can occur after, before, or during processes 51 and 52, the content server 21 updates the owner assertion database 25. The database 25 contains assertions vouched for by the owner, which can be contrasted from database 24, which contains assertions vouched for by the AA. As one example, in process 53 the owner could vouch for a particular URI of another domain (such as a particular URL 48 as shown in the FIG. 2, where the particular URL 48 is a different domain plus a particular extension). The AA server 20A associates a sub-AO 49 with the particular URL 48 in the database 25.

The AA server 20A may then provide an acknowledgement in process 54, which may or may not include the sub-AO 49. It should be understood that the content server 21 will configure the web page 23 to provide the relevant object (OA 31 or sub-AOs 41A-N) in response to a network call for the corresponding network call to the content server 21. This may involve building a table on the content server 21 to correlate each object (OA 31 or sub-AOs 41A-N) with a respective network call.

Figure 3B:
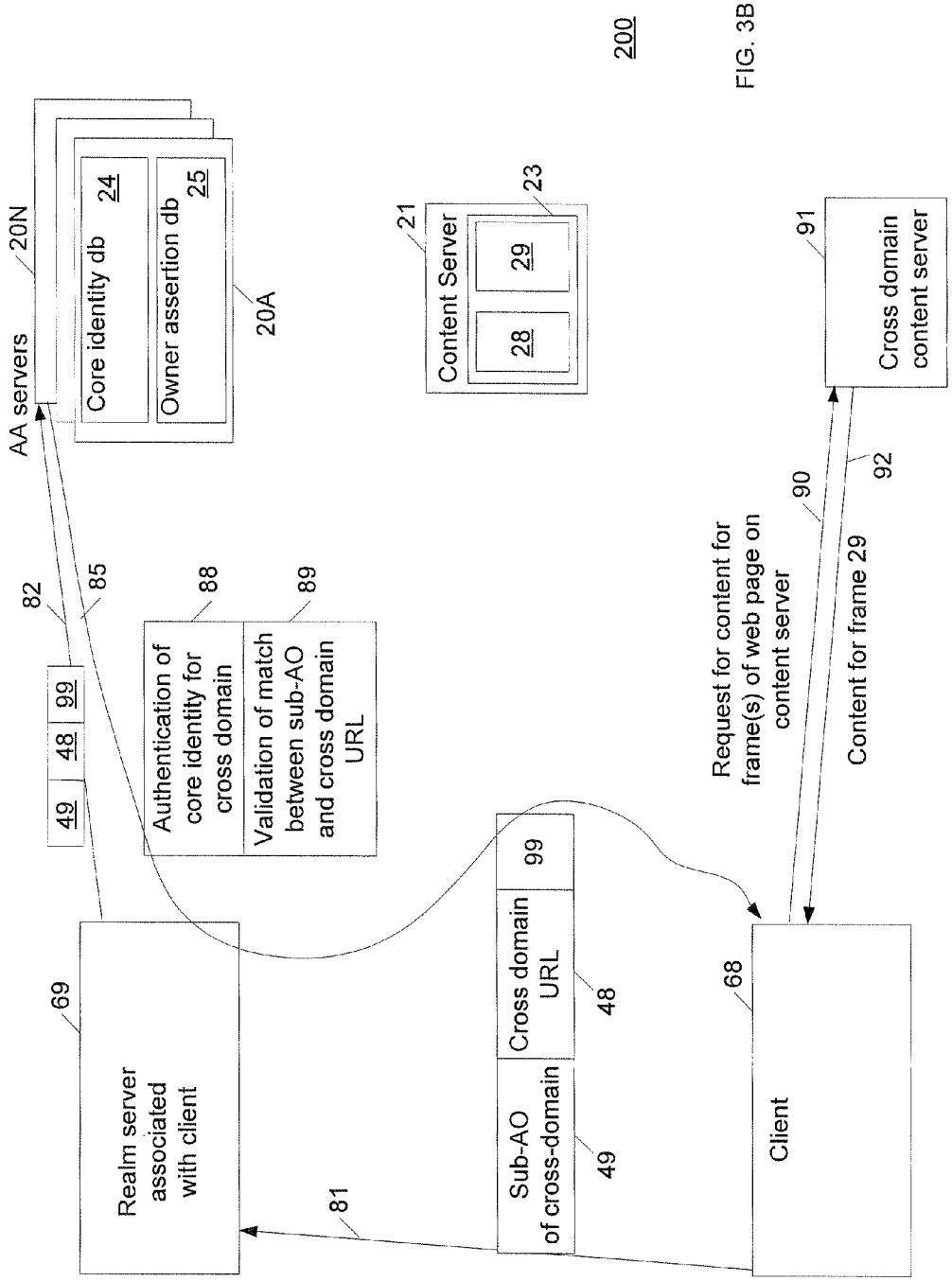

Having described the setup of the databases 24 and 25, the example will now move onto FIGS. 3A-B to illustrate how the configured databases 24 and 25 are utilized to authenticate domains in response to a client request.

FIGS. 3A-B illustrate one example of a client using the authentication server subsequent to the setup configuration of FIG. 2 in a multi-domain authentication process.

In process 60, a client 68, such as a browser or email application, attempts to access the web page 23 with the controlling frame 28 (FIG. 2). In response, in process 61 the content server 21 sends content 63 for frame 28 of the requested web page 23 as well as the corresponding object (AO 31) for the controlling frame 28. In examples where the subset of frames 28 includes other frames for the first domain besides the controlling frame 28, the response can also contain particular ones of the sub-AOs 41A-N that correspond to the accessed web page 23.

In the present example, the client 68 can embargo the content downloaded with the AO 31 in a secure location until authentication is complete for the domain of this content. In other examples, the client 68 can defer downloading this content until the first domain is authenticated (thus at this time only the AO 31 and possibly one or more sub AOs would be downloaded to the client 68 in the other examples).

The client 68 then locates a securely linked lookup, such as realm server 69. The realm server 69 is associated with the client and configured to find, on a per lookup basis, a particular one of the AA servers 20A-N for the domain of the accessed URL. In the present example, the realm server 69 can operate according to the RADIUS protocol. In other examples, the realm server 69 can operate according to the DIAMETER protocol.

The client 68 generates a checksum 98 based on a shared secret with the realm server 69. The checksum 98 will be used by the client 68 to correlate a received authentication response with this authentication request.

In process 77, the client realm server 69 accesses the request 75 to analyze the URL information 64 or the AO 31, or both. Based on the information from this analysis, the client realm server 69 uses RADIUS to identify the relevant server 20A of the AA servers 20A-N for the domain of the URL information 64. The client realm server then forwards the objects 31/41A, the URL information 64, and the checksum 98 to the identified AA server 20A.

The AA server 20A then extracts the AO 31 from the authentication request and compares the extracted AO 31 to the database 24 to identify a corresponding entry. If the domain 32 (FIG. 2) in the corresponding entry matches the URL information 64 included in the request, then the first domain has been authenticated.

The AA server 20A also accesses the owner assertion database 25 to check for assertions made by the owner of the authenticated domain. In this case, the AA server 20A identifies the entry for the cross domain (FIG. 2 shows this entry in database 25). The AA server 20A then extracts the sub-AO 49 and URL information 48 from the identified entry. It should be understood that, in other instances, there may be an assertion for the cross domain that is not necessarily in the form of a sub-AO. In these other instances, rather than including the sub-AO 49 for the cross domain, the AA server 20A would insert these assertions from the database 25 into the response.

The AA server 20A then sends a response to notify the client that the first domain is authenticated in process 78. The response includes the extracted sub-AO 49, the URL information 48, and the checksum 98.

The client 68 analyzes the response from the AA server 20A to identify the checksum 98 included therein. Based on the presence of the checksum 98 in the response, the client 68 has verified that the received response correlates to the authorization request. In this case, since there is a match, the client 68 has the information that the first domain has been authenticated by the AA.

Referring now to FIG. 3B, in process 81 the client sends a second authorization request for the sub-AO 49. The second request includes the sub-AO 49, the URL information 48, and a checksum 99.

The client realm server 69 accesses the request 81 to analyze the URL information 48 or the sub-AO 49, or both. Based on the information from this analysis, the client realm server 69 uses RADIUS to identify a relevant one of the AA servers 20A-N for the domain of the URL information 48. As the first and second domains are different, there is a possibility that a different one of the AA servers 20A-N will be identified. For ease of explanation, in this example the second request is forwarded to a different one (20N as illustrated) of the AA servers 20A-N. The client realm server then forwards the object 49, the URL information 48, and the checksum 99 to the identified AA server 20N in process 82.

The AA server 20N the compares the sub-AO 49 of the second request to a core identity database thereon. The comparison will elicit a corresponding core identity for the second domain. The AA server 20N then compares the URL information 48 from the second request with the domain information in an entry for the corresponding core identity. Based on the comparison, the second domain has now been authenticated by the AA. The AA server 20N can also verify that the URL/sub-AO combination 48/49 included in the request matches a combination included in the core identity database of the AA server 20N.

It should be understood that the processing of the second request is performed to authenticate the second domain on the basis of core identity. Prior to the processing of the second request, the only vouching that has taken place for the URL of the second domain is the vouching by the owner for the first domain. Although the owner of the first domain has been authenticated, the vouching by such authenticated owner in the database 25 has not been authenticated by the AA. As explained previously, the two databases 24 and 25 are logically separated, with the former including core identity statements vouched by the AA and the later containing statements vouched by the owner (but not necessarily validated by the AA).

Having the core identity of the second domain now authenticated by the AA, in process 85 the AA server 20N can respond to the client 68 for the second authorization request. The response includes the authentication results 88 as well as a validation 89 of correspondence between the particular sub-AO and the particular URL. As before, the response can include the checksum 99 to allow the client 68 to verify that this response corresponds to the second authorization request.

In process 90, the client 68 can make a call to the server(s) 91 of the now-authenticated cross domain. The client 68 receives back content for the frame 29 corresponding to the URL of the second domain in process 92. In other examples, the client 68 may have prefetched the content for the frame 29 prior to authenticating the cross domain. In these other examples, the prefetched content is embargoed in a secure location on the client 68 until the cross domain is authenticated.

After process 92, the client can now display the entire web page 23 using content from both domains. Additionally, since the authentications by the AA were made on a domain level rather than a server level, the client can also display any portions of the web page 23 drawn from any servers of either domain.

It should be apparent that the client 68 may perform an additional process to further verify the authentication results from the AA. For example, the client 68 can forward the authentication results to a security application operating a reputation database (typically the reputation database is operated by a different party than the AA).

It should be understood that the functions described above with respect to FIGS. 3A-B are performed by novel software distributed over the client 68, some or all of the content servers of the domains (including illustrated content servers 21 and 91), the realm server 69, and the AA servers 20A-N.

Figure 4A:
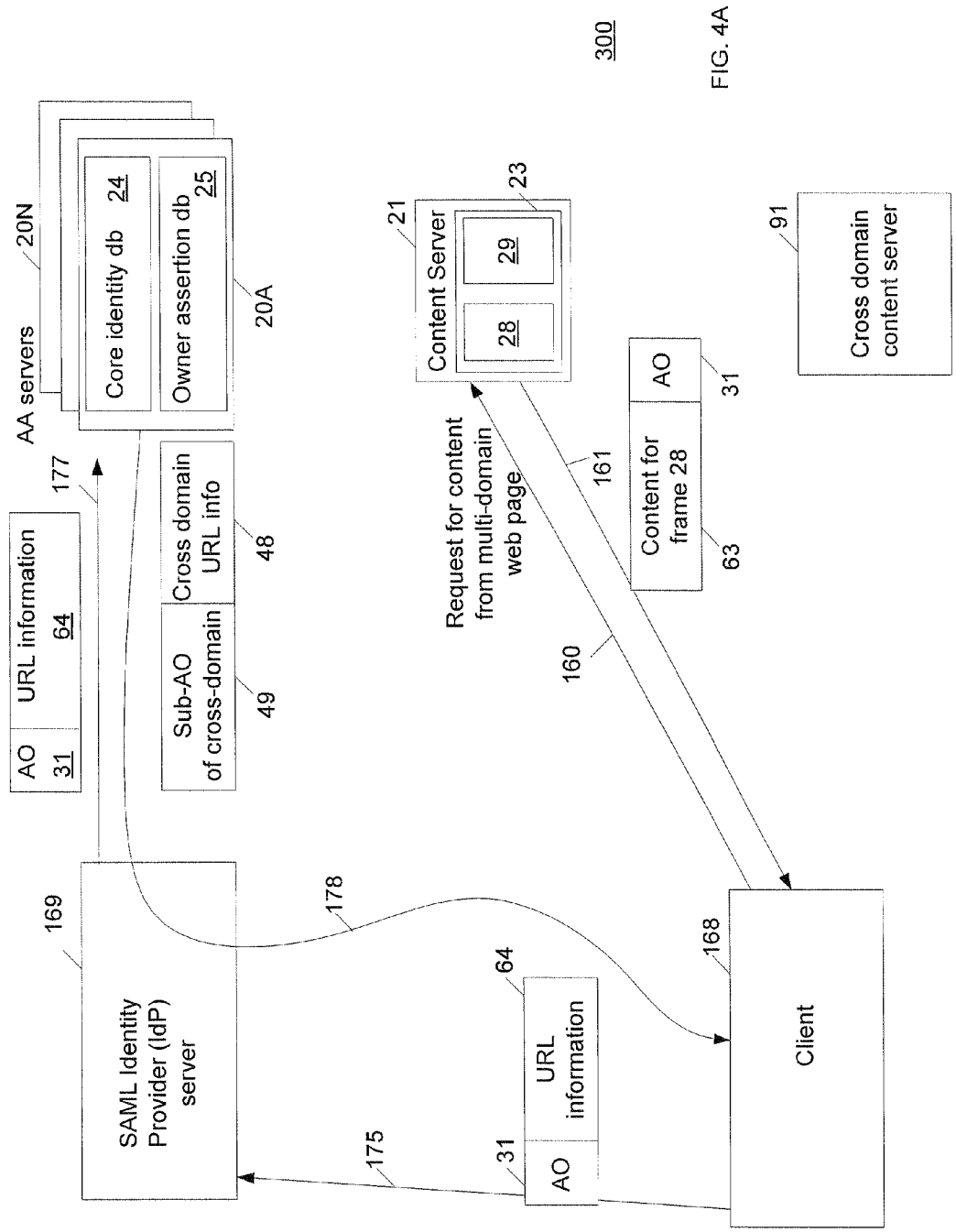
FIG. 4A-B illustrates a different example of a client using the authentication server subsequent to the setup configuration of FIG. 2 in a multi-domain authentication process.

FIG. 4 illustrates a different example of a client using the authentication server subsequent to the setup configuration of FIG. 2 in a multi-domain authentication process.

The example described with reference to FIG. 4 includes components programmed with the SAML protocol, rather than components configured with the RADIUS protocol as described with FIGS. 3A and 3B. It should be understood that the setup process described in FIG. 2 is general and applicable to both the example of FIGS. 3A-B and the example of FIG. 4.

In process 160, a client 168, such as a browser or email application, attempts to access the web page 23 with the controlling frame 28 (FIG. 2). In response, in process 161 the content server 21 sends content 63 for frame 28 of the requested web page 23 as well as the corresponding object (AO 31) for the controlling frame 28.

The client 168 analyzes the response and, in response to detecting the AO 31, logs into the SAML IdP server 169. This login process can involve clearing cached data or anything that is insecure before the login, particularly if the client 168 is a browser. The login could also authenticate the end user by verifying that the network location of the client 168 matches a known location for a client 168 operated by this user. The login could also utilize multiple access levels, where different users are given different authorities once logged in. Once the client 168 is logged into the SAML IdP server 169 these two devices are federated, and the client 168 can provide the AO 31 and URL information 64 to the SAML IdP server 169 in process 175.

Thereafter, the AA can then authorize the client 168 to be federated to one, any, or all of the AA servers 20A-N using the SAML IdP server 169. For example, the SAML IdP server 169 could federate the client 168 with only the particular one of the AA servers 20A-N that corresponds to the AO 31 in one example, or all of the AA servers 20A-N in another example. The federation secures the communications independently of the checksum scheme described previously.

Figure 4B:
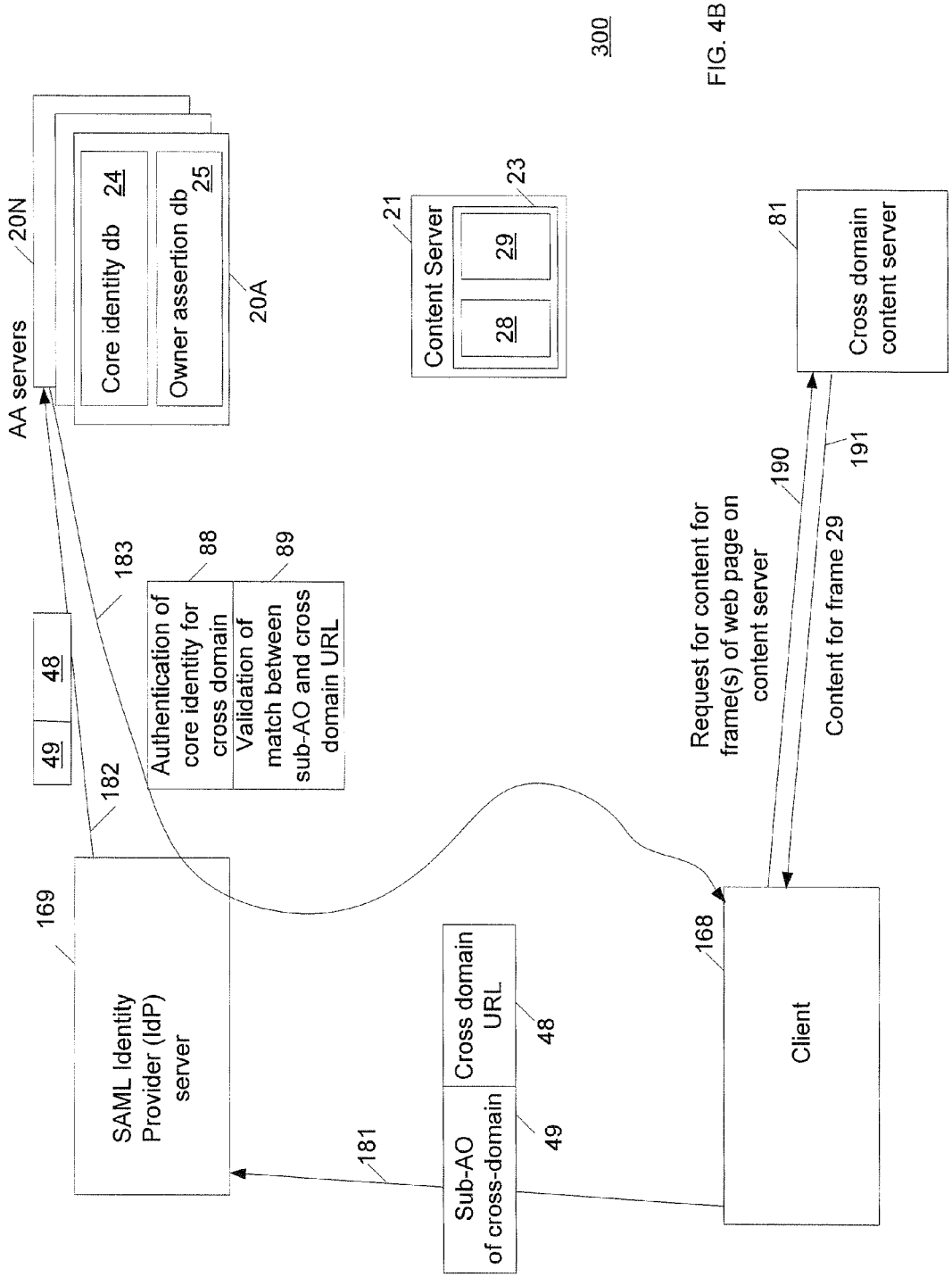

After federation is complete, the process continues with the AA server 20A receiving the initial authentication request in process 177, performing similar authentications as described previously before responding in process 178. Referring to FIG. 4B, processes 181, 182, and 183 associated with the second authentication are conducted in a similar fashion as the second authentication described earlier with respect to FIG. 3B.

One difference between the system 300 and the system 200 arises if the client 68 utilizes a security application separate from the AA. In the present system 300, the SAML IdP server 169 can federate in any other devices specified by the client 168. For example, the SAML IdP server could federate in a security application operating a reputation database to monitor the authentication process and validate the results as they are generated.

It should be understood that the functions described above with respect to FIGS. 4A-B are performed by novel software distributed over the client 68, some or all of the content servers of the domains (including illustrated content servers 21 and 81), the SAML IdP server 169, and the AA servers 20A-N.

Figure 5:
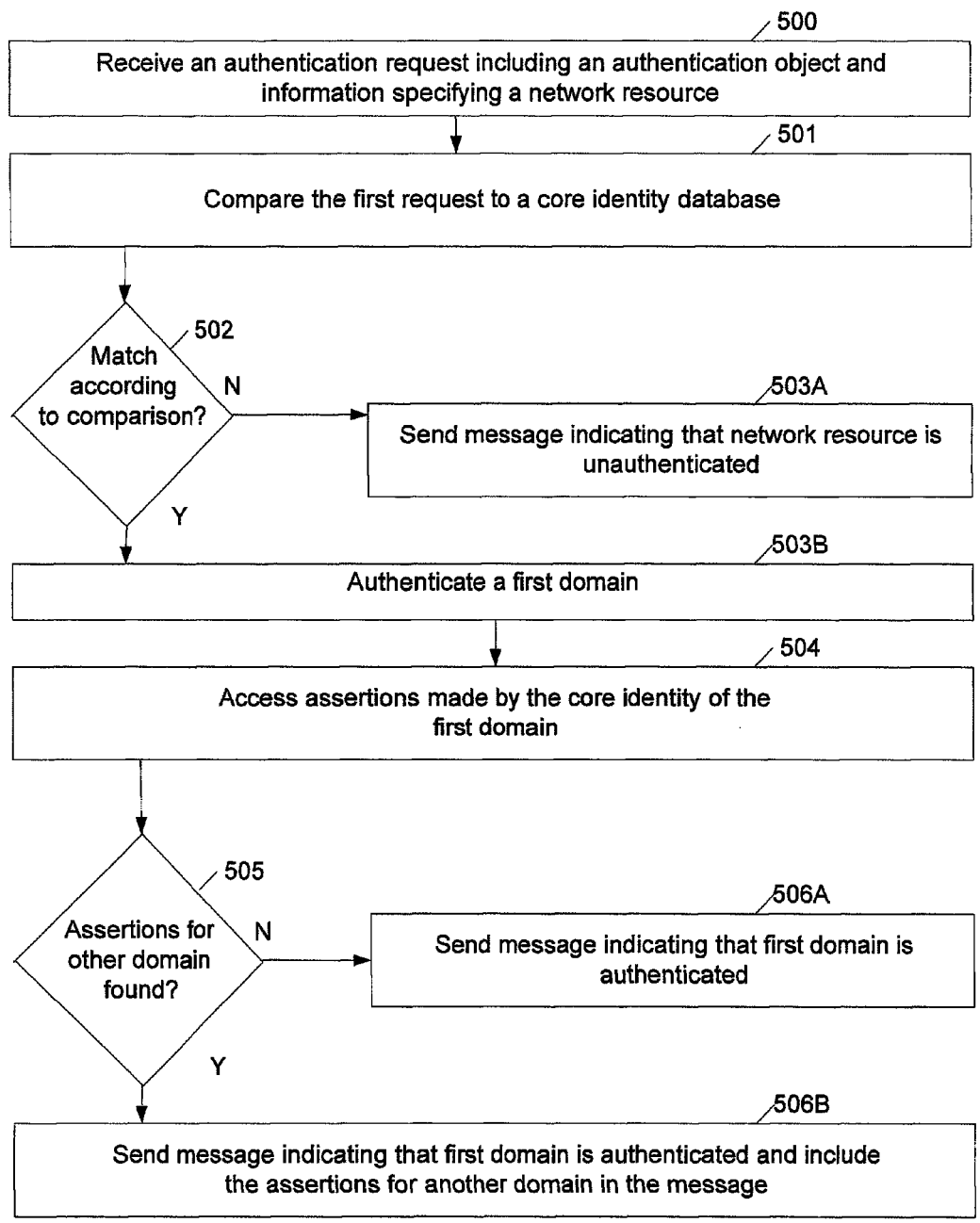
FIG. 5 is a flow chart illustrating a process performed by a first Authentication Authority server from FIGS. 3A-4B.

FIG. 5 is a flow chart illustrating a process performed by a first Authentication Authority server from FIGS. 3A-4B.

In block 500, the AA server receives an authentication request including an authentication object and information specifying a network resource. In block 501, the AA server compares the first request to a core identity database. If the comparison indicates that the network resource does not correspond to a core identity of the authentication object in diamond 502, then in block 503A the AA server sends a message indicating that the network resource is unauthenticated.

If there is a match in diamond 502, then in block 503B the AA server authenticates the first domain. In block 504, the AA server accesses assertions made by the core identity of the first domain. If no authentication objects are found for any other domains in the assertions in diamond 505, then in block 506A the AA server sends a message indicating that the first domain is authenticated.

If an assertion for a second different domain is found in diamond 505, then in block 506B the AA server sends a message indicating that the first domain is authenticated that includes the assertion for the second domain in the message. The assertion can be an authentication object for the second domain. It should be understood that, depending on the number of other domains the core identity of the first domain has vouched for, there could be more than one assertion included in the message.

Figure 6:
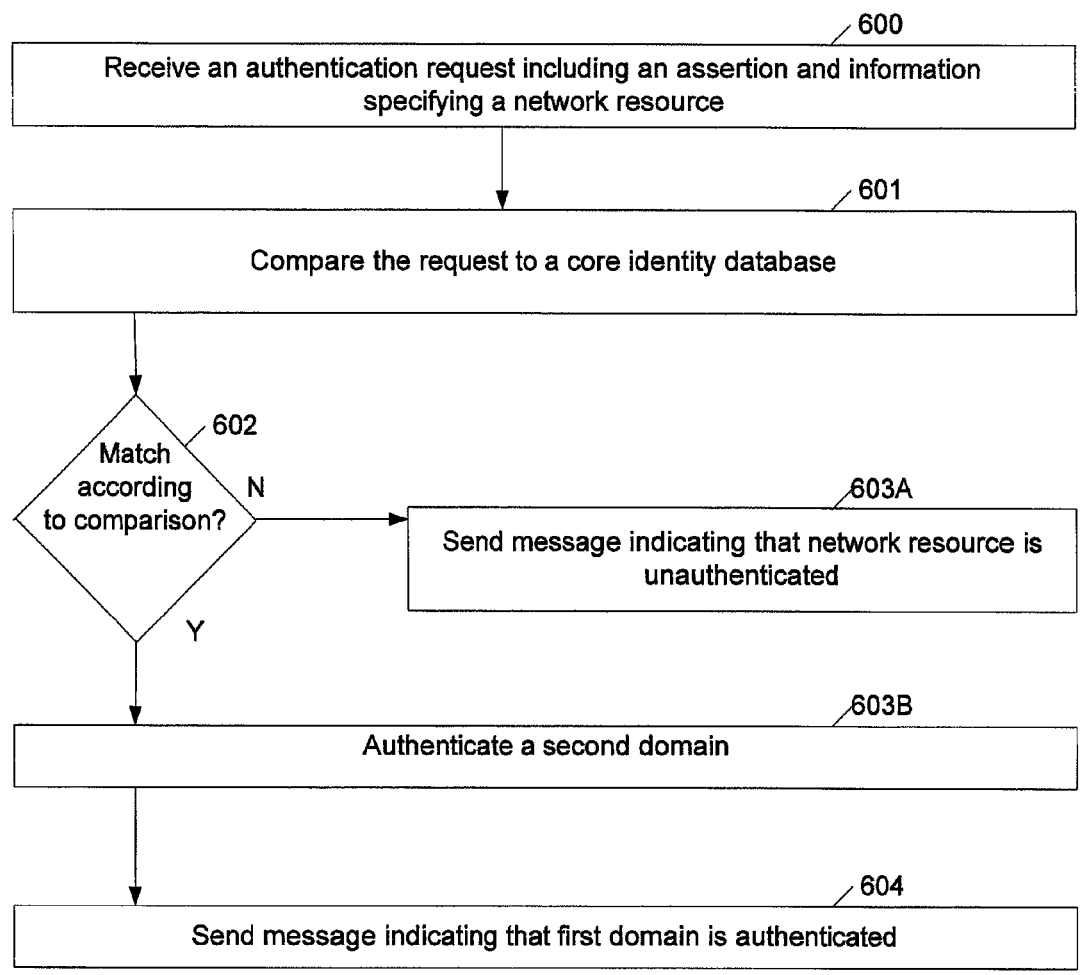
FIG. 6 is a flow chart illustrating a process performed by a second Authentication Authority server from FIGS. 3A-4B.
Figure 7:
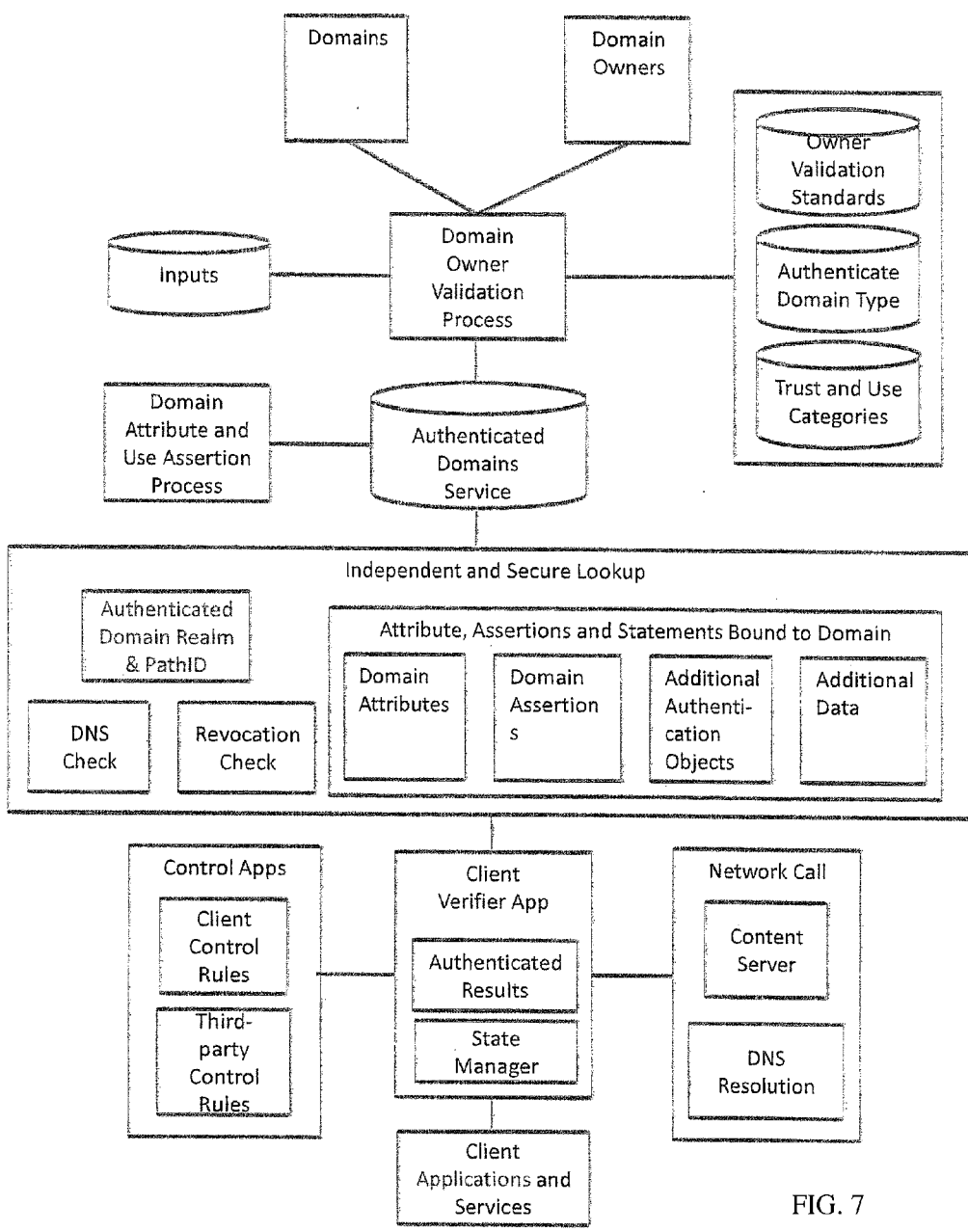
Figure 9:
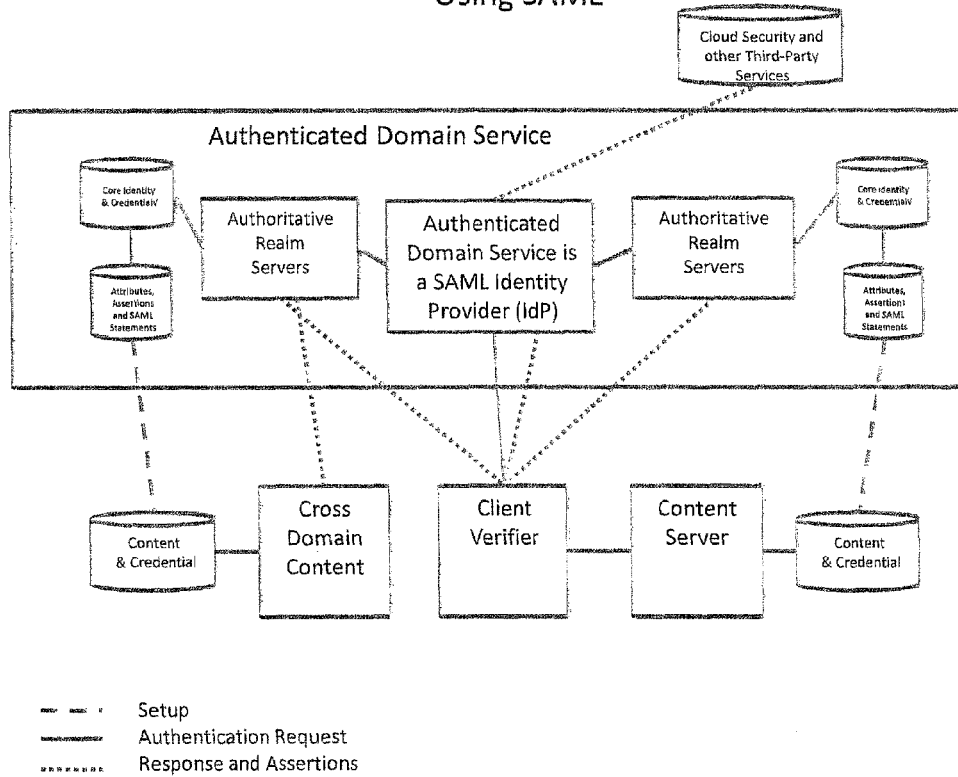
Figure 10:
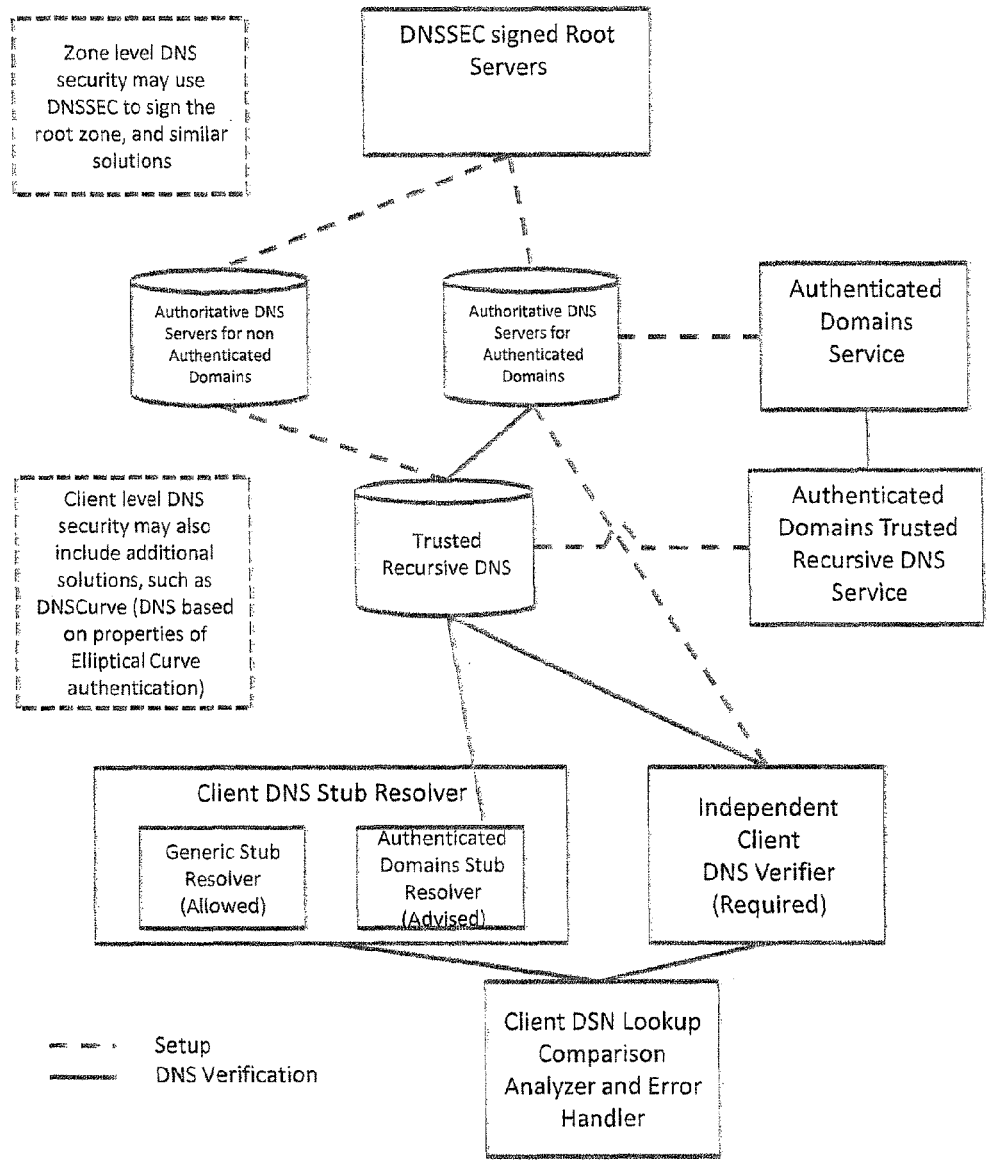
Figure 11:
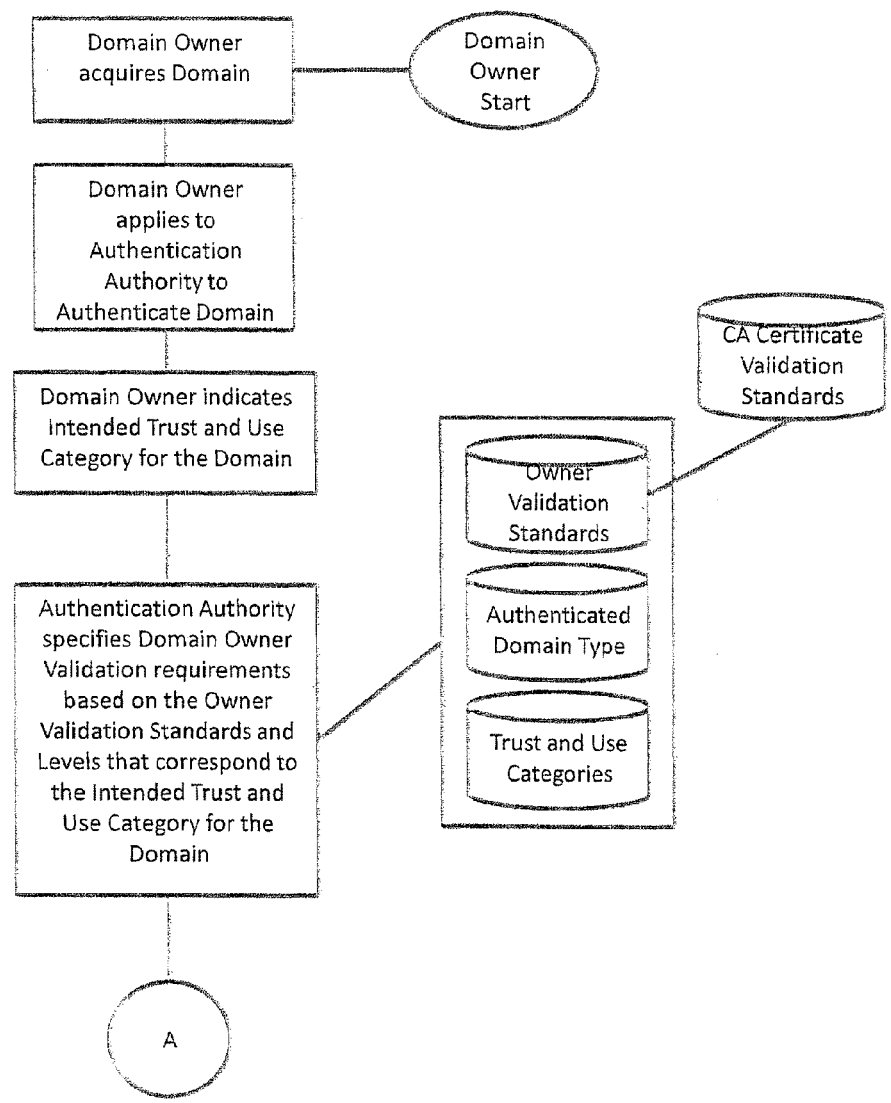
Figure 12:
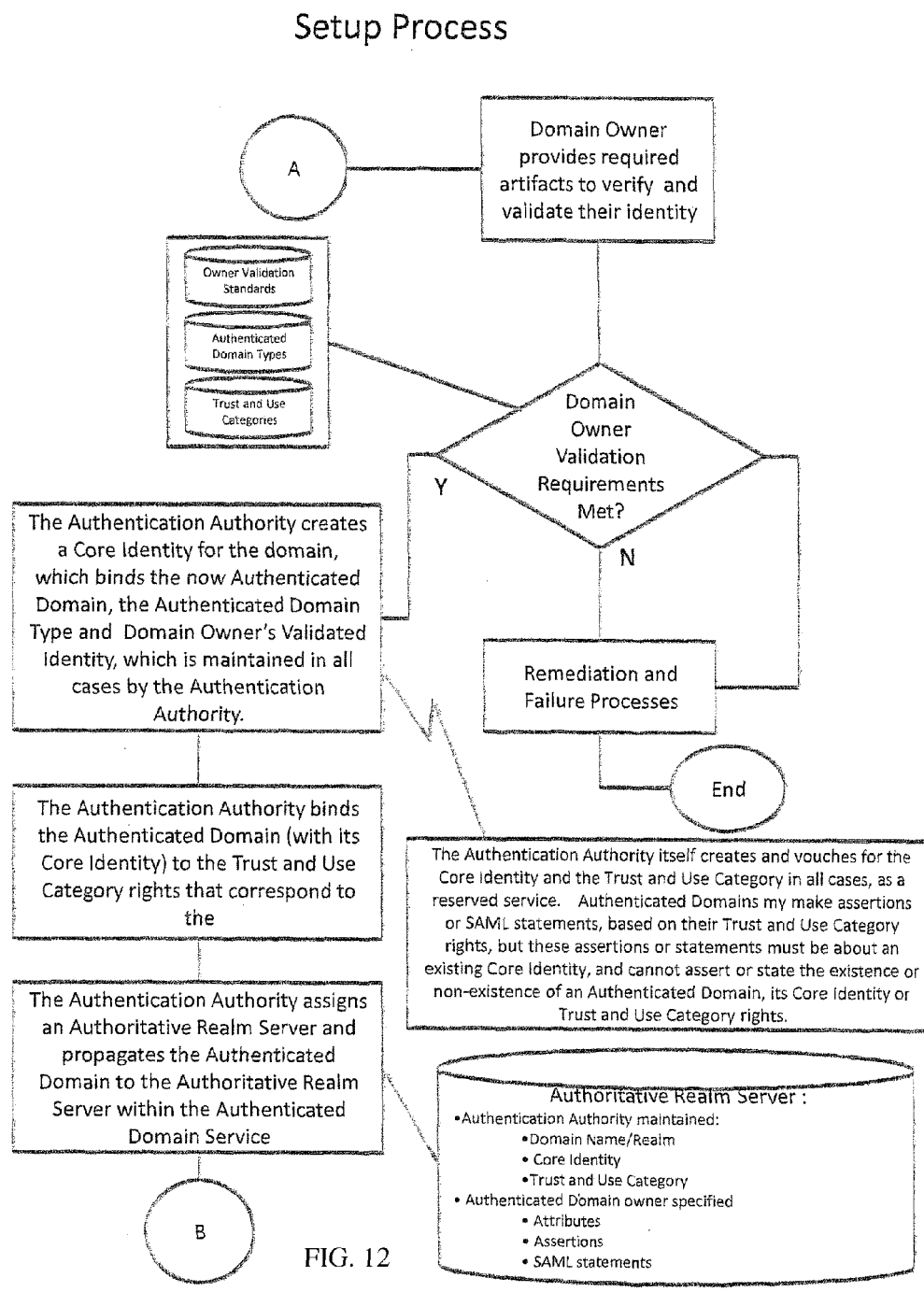
Figure 13:
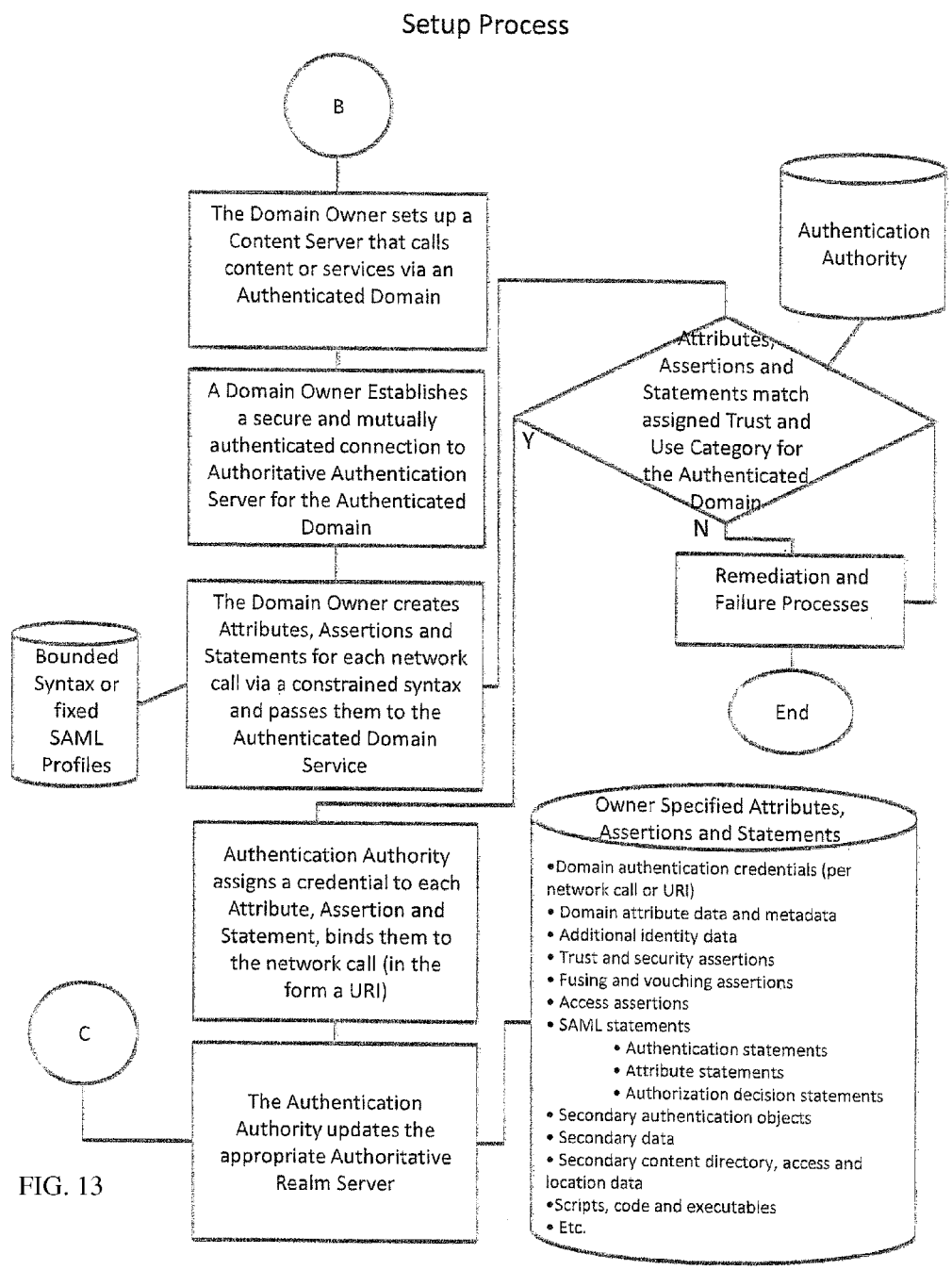
Figure 14:
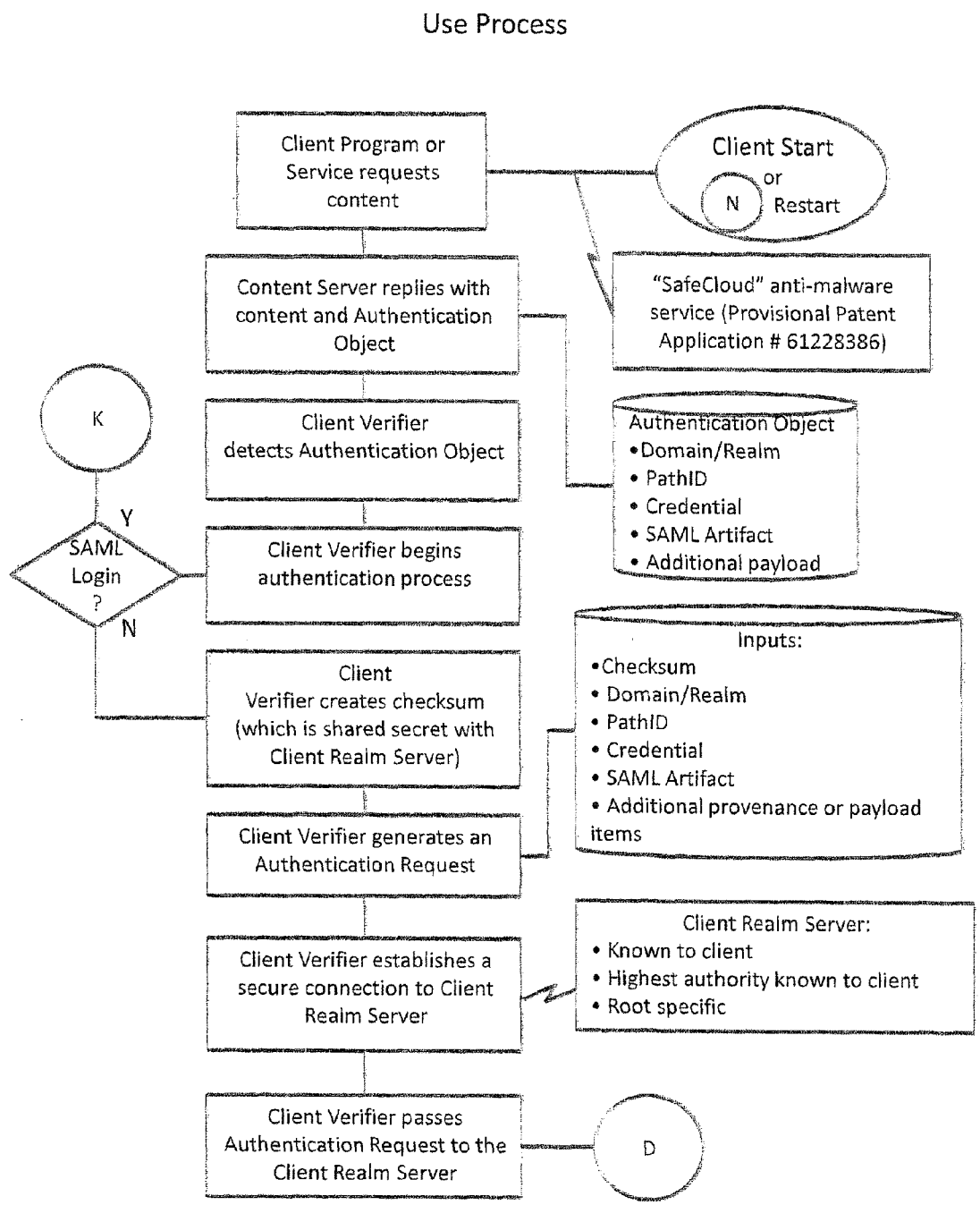
Figure 15:
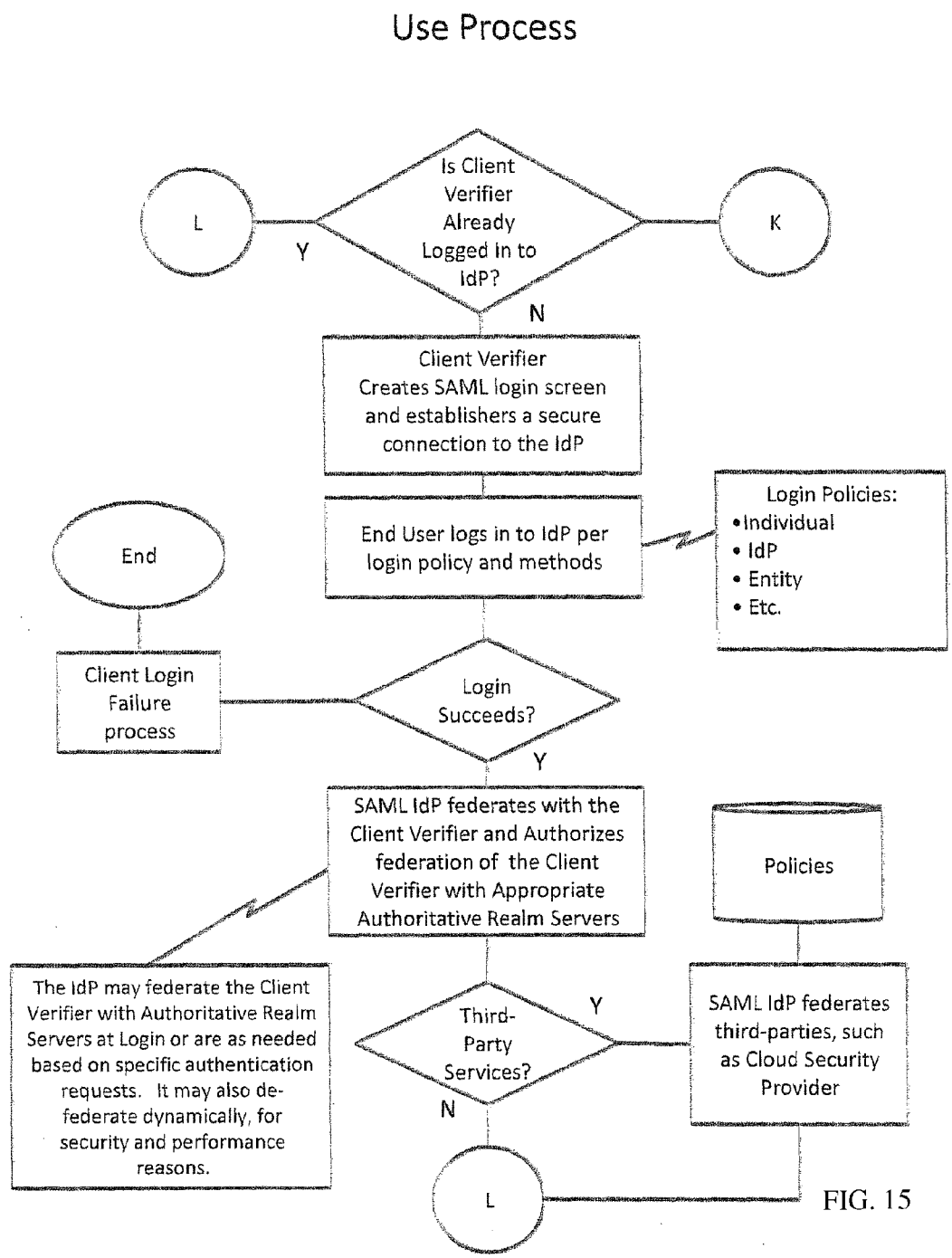
Figure 16:
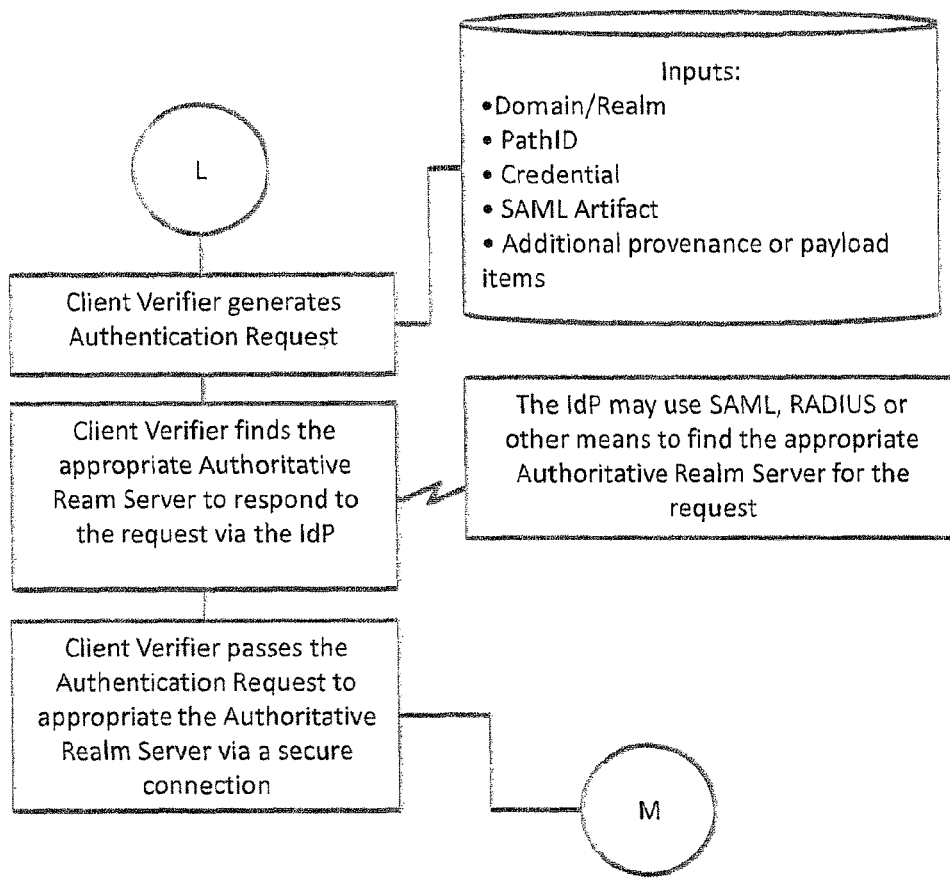
Figure 17:
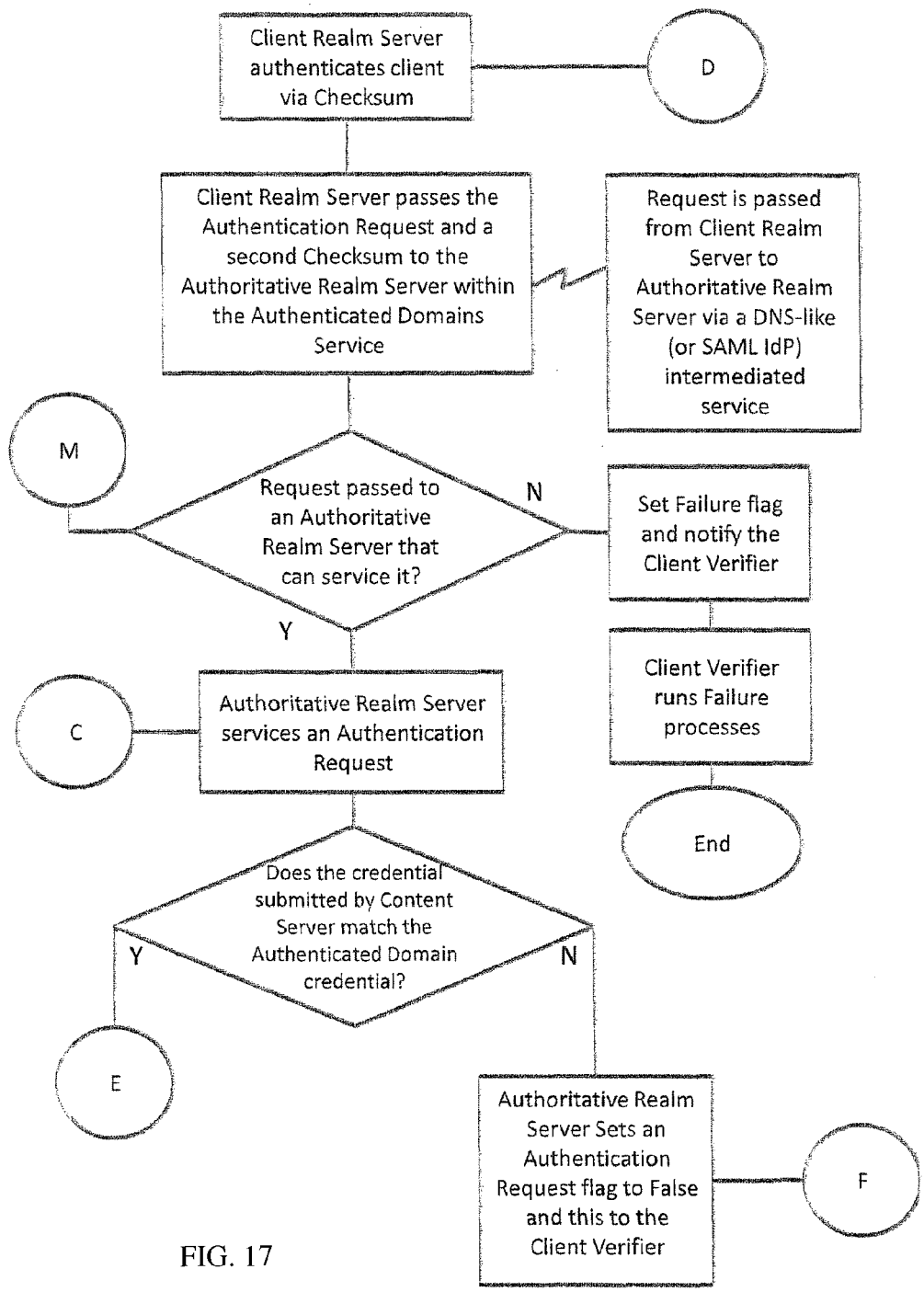
Figure 18:
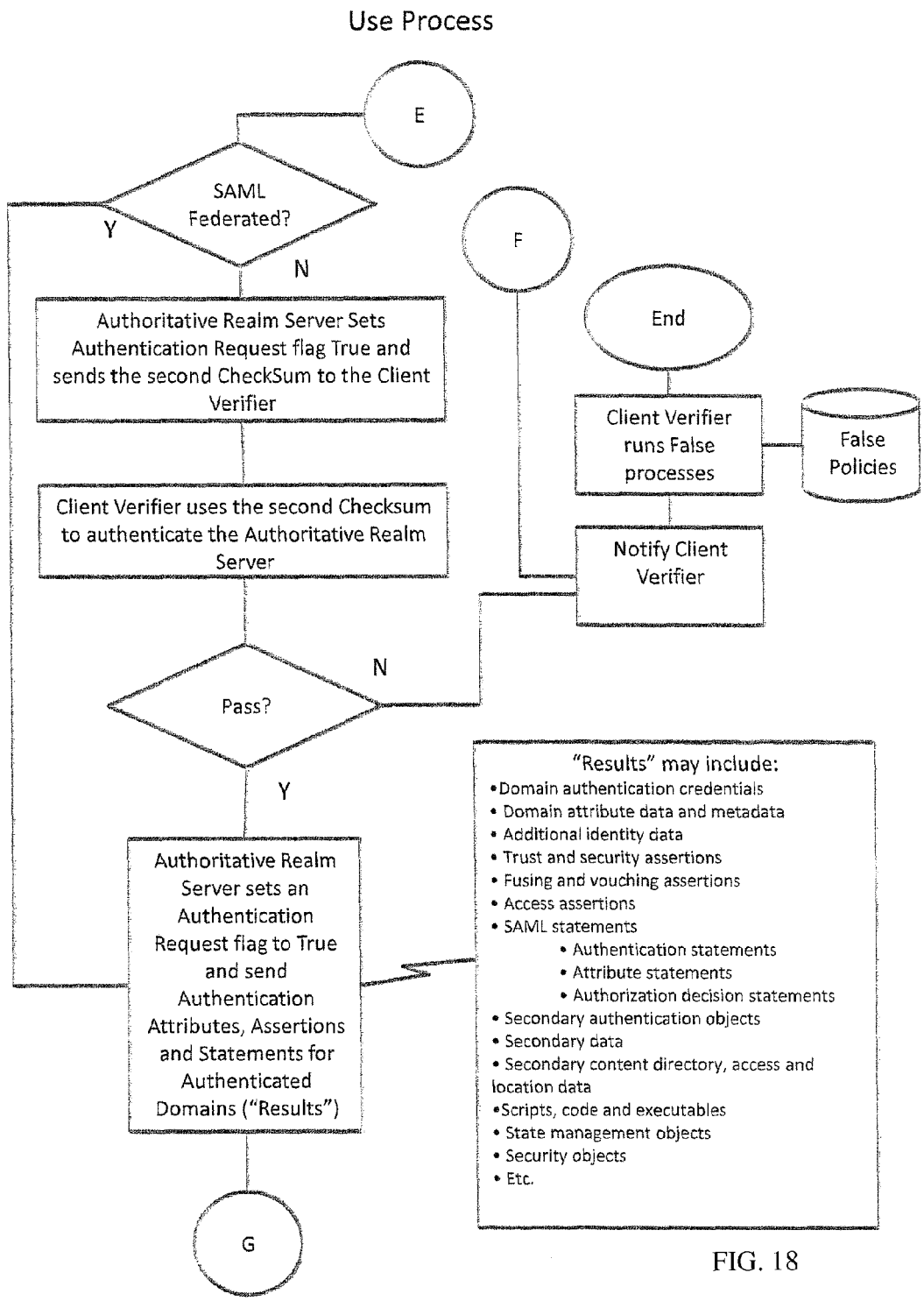
Figure 19:
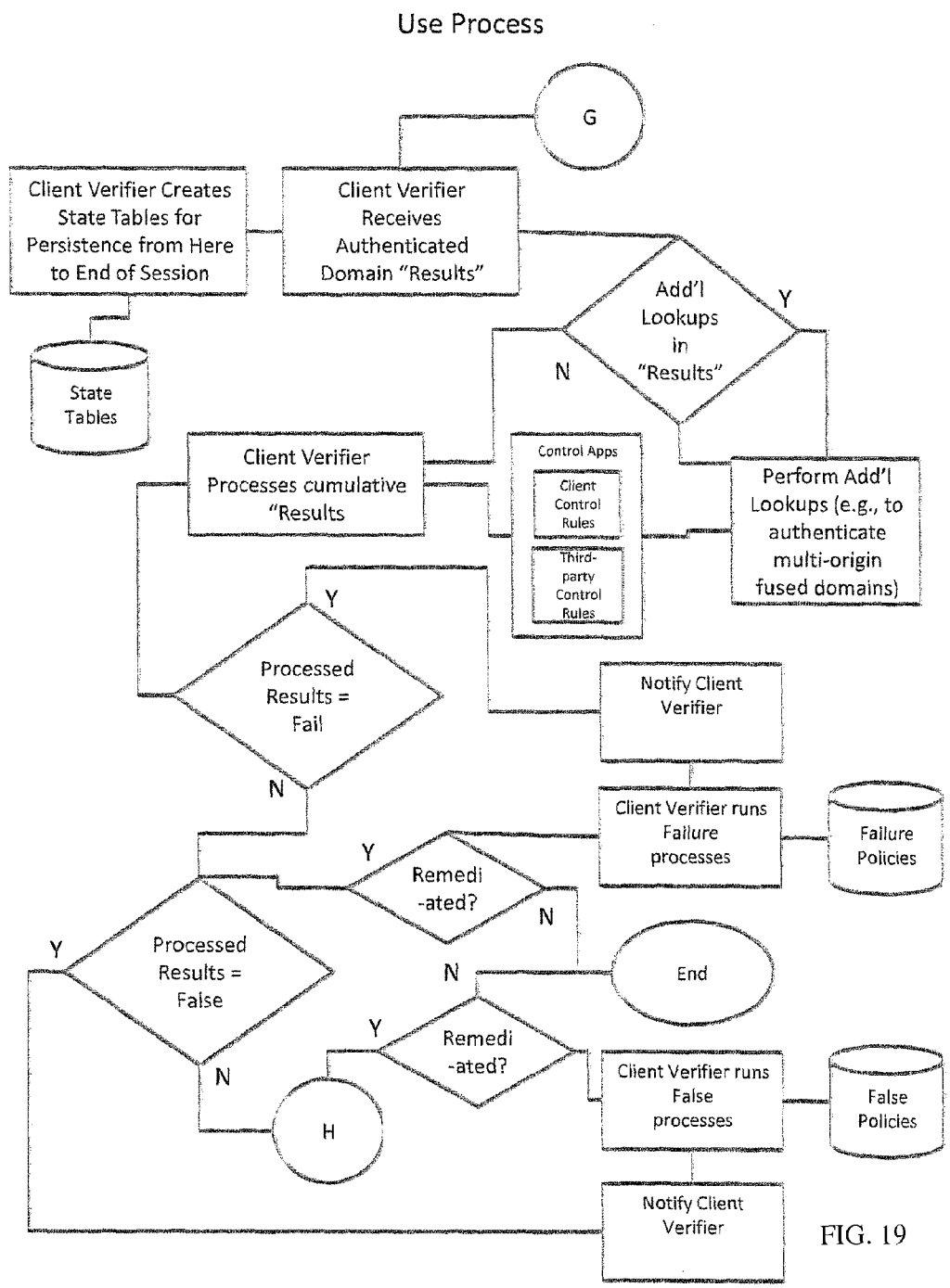
Figure 20:
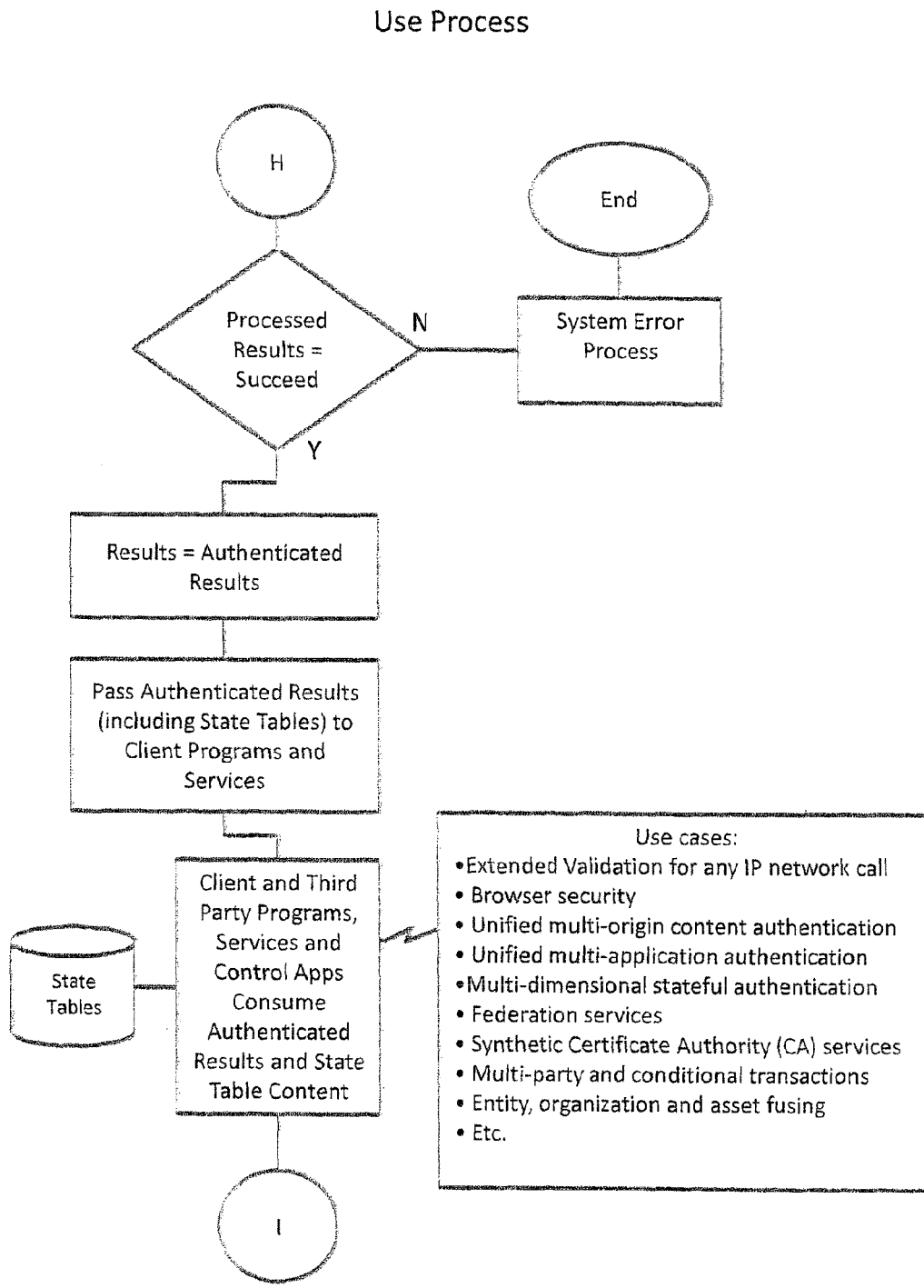
Figure 21:
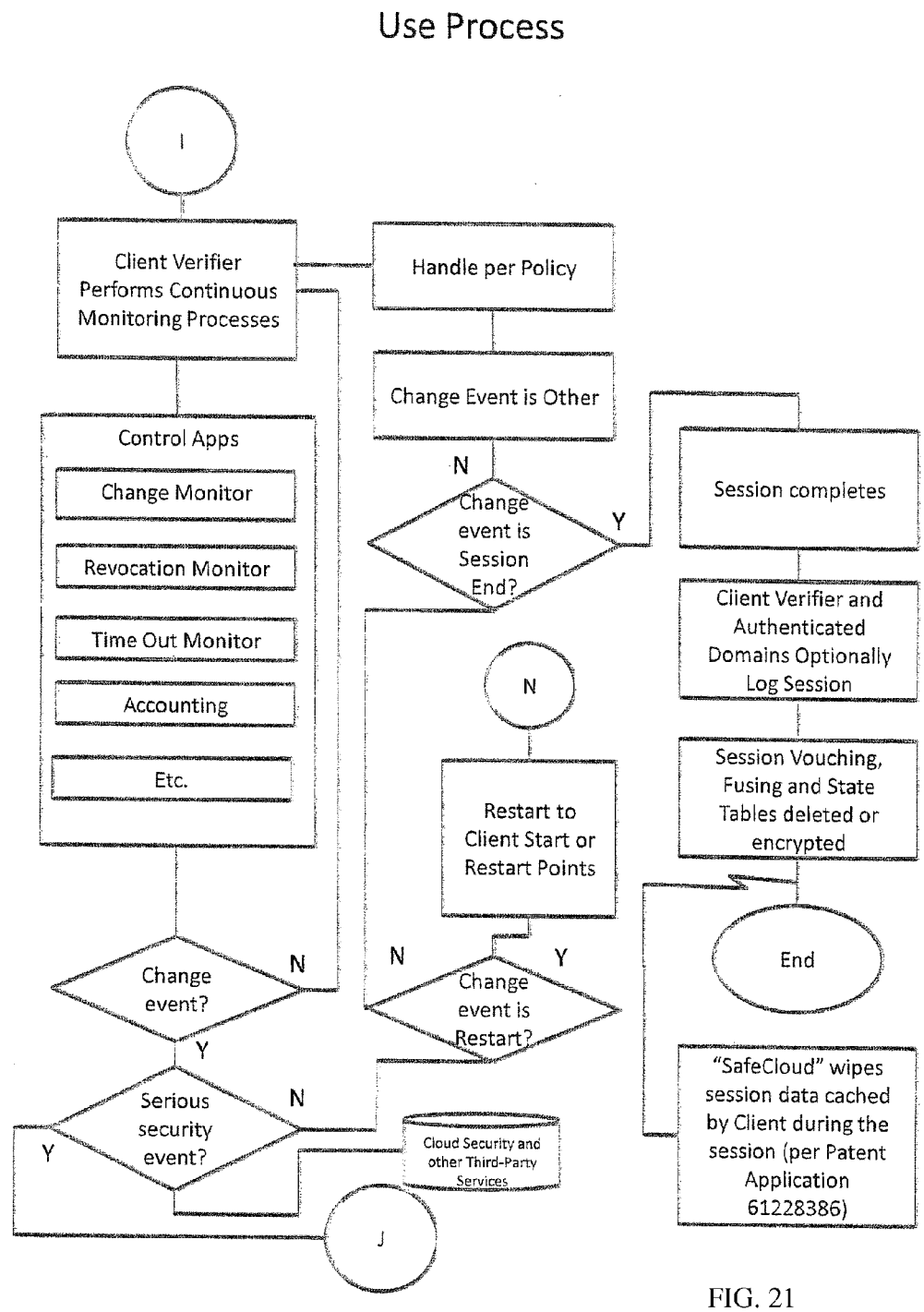
Figure 22:
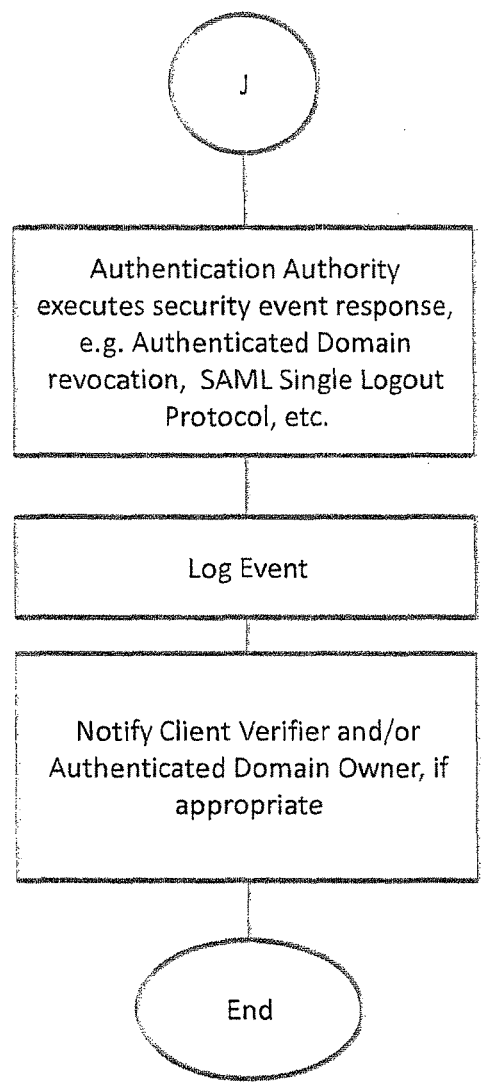

FIG. 6 is a flow chart illustrating a process performed by a second Authentication Authority server from FIGS. 3A-4B.

It should be understood that the processes described below can be performed by the same server performing the processes described with respect to FIG. 5A. The server that receives the authentication request for the core identity of the second different domain may or may not be different than the server that received the authentication request for the core identity of the first domain, as described in more detail earlier. For ease of explanation the term "AA server" will again be used, but it should be understood that this refers to "the same or another" AA server.

In block 600, the AA server receives an authentication request including an assertion for a second domain and information specifying a network resource in the second domain. In block 601, the AA server compares the request to a core identity database. If there is no match in diamond 602, then in block 603A the AA server sends a message indicating that the network resource specified in the request is unauthenticated.

If there is a match in diamond 602, then in block 603B the AA server authenticates the second domain. The AA server sends a message indicating that the first domain is authenticated in block 604.

FIGS. 7-22 illustrate another example of a domain based authentication system. The text included within the boxes themselves describes this example.

In an example, there is provided a method of authentication to authenticate groups of domains holistically as one. The domains can be grouped based on their making up a web page (e.g., made up of frames), an online session, a set of interacting applications or interacting devices. The domains that make up a group can be multi-origin (i.e., different domains such that content is from different sources).

In an example, ownership of domain names is validated by a single and authoritative entity and the validating entity is also the Authentication Authority. Domain ownership validation can be done to one or more fixed Owner Validation Standards. Each Owner Validation Standard can equate to a specific Authenticated Domain Type or category. Each particular Authenticated Domain Type defines a particular defined level of Ownership Validation. Owner Validation Standards for the Authenticated Domain Types can range from high and rigorous to low and less rigorous. Each Authenticated Domain Type can be assigned a particular Trust and Use Category. The assigned Trust and Use Category for an Authenticated Domain can also define specific trust and use Assertions. The Authentication Authority controls and enforces said trust and use Assertions such that the owner of each Authenticated Domain has access only to those trust and use assertions assigned to its Authenticated Domain Type. The trust and use relationship for multiple Authenticated Domains of a specific Authenticated Domain Type can be equivalent and normal, and the Trust and Use relationships between Authenticated Domains of different Authenticated Domain Types are defined and fixed.

In one example, the Authentication Authority vouches for the Core Identity of an Authenticated Domain in all cases. The Core Identity can equate to a binding of the Authenticated Domain, the Authenticated Domain Type and the specific Domain Owner data as defined by the Authenticated Domain Type. The Domain Owner may make Assertions about the Authenticated Domain, but not about the Core Identity of the Authenticated Domain. Such Assertions can be governed by the Trust and Use Category as set by the Authentication Authority of the Authenticated Domain making the Assertion.

The Domain Owners can implement, remove, update and change said Assertions via an Authentication Authority provided and controlled set of Statements. The Statements are governed by those allowed by the Authentication Authority for each Trust and Use Category. Authenticated Domains of a high Trust and Use Category have rights to Statements that assert higher levels of trust and functionality than those available to Authenticated Domains of a lower Trust and Use Category. A high level Authenticated Domain may execute Statements that are Assertions about equal or lower level Authenticated Domains, or about themselves. The Statements may include Assertions that extend or assert aspects of the Identity, Trust, Use or other attributes of one Authenticated Domain to one or more other Authenticated Domains, (but not about the Core Identity of the Authenticated Domain). Said other Authenticated Domains may be Authenticated Domains that are owned by other Domain Owners or are serviced by systems and sources other than the Authenticated Domain making the Assertions. The Assertions can include Statements that Assert that another Authenticated Domain should be considered equal to the Asserting Authenticated Domain in terms of identity, trust, use or other attributes, such that the Authenticated Domain may be treated as Fused by consuming Client Applications and Services with respect to the attributes of these Assertions.

The Client Applications and Services include network calls to content from multiple origins. Client Applications and Services and external applications and services can operate on and treat groups of Authenticated Domains as one. The operations and treatment of a group of Authenticated Domains can be the same as the operation and treatment of one of the Authenticated Domains.

State information can be maintained across groups of Authenticated Domains. The Authentication Domains that provide data making up a web page, a session, interacting applications, services or devices.

A Content Server can send an Authentication Object to a Client in response to a Client access, to authenticate the Authenticated Domain sending the content, along with the content. The Authentication Object can contain credentials, Realm data, PathID, digital certificates or other provenance items to prove the identity of the source Authenticated Domain sending the content.

Data relating to the Authentication Object is securely maintained at an Authoritative Realm Server, which can be part of and under the control of the Authentication Authority. For example Realm data and Path ID from the Authentication Object can equate to a Uniform Resource Indicator (URI) or Uniform Resource Locator (URL).

The Security Assertion Markup Language (SAML) protocol and standards can be used to federate a Client Verifier with the Authentication Authority. Similarly, the SALM protocol and standards can be used to securely federate said Client Verifier and said Authentication Authority with said Authoritative Realm Servers. The Authoritative Realm Servers are the authoritative source for an Authenticated Domain's Core Identity (which is maintained exclusively by the Authentication Authority) and Statements and Assertions about the Authenticated Domain (which are maintained by the Authenticated Domain Owner). In another example, a Remote Access Dial Up Service (RADIUS) service or its successor DIAMETER can be used to authenticate an Authenticated Domain, used by a Content Server, to a Client Verifier.

In one example, the Content Server can send an Authentication Object to the Client Verifier to authenticate that it came from a specific Authenticated Domain. The Client Verifier forwards said Authentication Object as an Authentication Request to a Client Realm Server, which is under the control of the Authentication Authority, along with a Checksum that is known between the Client Verifier and the Client Realm Server. The Client Realm Server authenticates via said Checksum that the Authentication Object came from the Client Verifier. The Client Realm Server uses RADIUS to find and securely communicate with the Authoritative Realm Server that can service the Authentication Request. The Client Realm server creates a new Checksum and sends it along with the Authentication Request to the Authoritative Realm Server.

Continuing the example of the previous paragraph, the Authoritative Realm Server determines if the Authentication Object is from the Authenticated Domain that claimed to send the content by comparing the Credential, Digital Certificate or other Provenance Items, in the Authentication Object with Credentials, Digital Certificates or other Provenance Items for the Realm and PathID maintained at the Authoritative Realm Server. The Authoritative Realm Server sends the Results of the Authentication Request to the Client Verifier. The Authoritative Realm Server sends the new Checksum generated by the Client Realm Server to the Client Verifier along with the Results of the Authentication Request to authenticate the Authoritative Realm Server to the Client Verifier. The Results sent by the Authoritative Realm Server include Core Identity data about the Authenticated Domain sending content from the Content Server. The Results are used by the Client Verifier, End Use, Client Applications or Services or Control Apps to verify if the content was sent by the Authenticated Domain. Additionally the Client Verifier, Control Apps, Client Applications and Services or third party applications and data bases can be used to determine if the content may be trusted or used in a specific context.

Continuing the example of the previous paragraph, the Results may include additional Authentication Objects, Statements and Assertions sent by the Authoritative Domain Server for the primary Authenticated Domain, to vouch for network calls to secondary Authenticated Domains that were part of the total content sent by Content Server, along with the primary or controlling Authenticated Domain. The Client Verifier iteratively authenticates the secondary Authentication Objects, such that multiple Core Identities are authenticated as a group. The Client Verifier, and helper applications, can then treat the grouped or fused Authenticated Domains, and Statements and Assertions about them as one.

It should be understood that entities may maintain and communicate their corporate or IT structure via Statements and Assertions that they maintain directly within an Authoritative Realm Server, where the Authentication Authority maintains the Core Identities for the Authenticated Domains involved and the Authoritative Realm Server. A network address, such as an address made up of tupels or an ordered list of elements, can be represented by a Top Level Domain where the domain names always exactly equal the network address. Said domain name of the core identity database is an Authenticated Domain. Client Verifiers and helper applications, such as security and reputation services, can treat network addresses as non-variable Authenticated Domain Names that always resolve to one and only one network address. Said network address Authenticated Domains are treated by Client Verifiers, overlay security, reputation and helper applications, as normatively equal to traditional domain based Authenticated Domains.

In one example, the Authentication Authority can track and report on the Usage or Instances of an Authenticated Domain authentication. The Usage or Instance of the Authenticated Domain is to call a logo, brand or other entity identifying mark. A transaction fee is tabulated every time an Authenticated Domain is authenticated.

In one example, a Uniform Resource Identifier (URI) or Uniform Resource Locator (URL) is defined as a subset of an Authenticated Domain. A fully qualified domain name in a URI or URL is defined as the Authenticated Domain in a URI or URL that includes an Authenticated Domain. Extensions to the Authenticated Domain Name can include prefixes and suffixes to the fully qualified domain name in an Authenticated Domain. The Extensions denote defined or well known services. The fully qualified domain name can be equal to the Realm of an Authenticated Domain and the Extension can be equal to the PathID of an Authenticated Domain Name. The Realm and PathID equal the URL or URI of a unique network call, such as a client request for content to a Content Server or the multi-origin network calls that may be included the Content Servers response to the initial content request, are uniquely identifiable and atomic.

The URI or URL, in the form of a Realm and PathID, may be assigned unique identifying Credentials, Digital Certificates, Provenance Items, Assertions or Statements. Well known services equate to a specific technical or use context.

In an example, multi-origin authentication is complete after some or all parties successfully authenticate.

In one example, CA issued digital certificates can be re-validated to conform to Authenticated Domain standards. The re-validated CA issued digital certificates can operate as and be equal to Authenticated Domains.

In one example, the Client Verifier (also "client") or helper applications can maintain a list of Authenticated Domains that are also members of a pre-vetted group of domains. The Client Verifier can be a "clientless" browser helper application, that is downloaded by the Authentication Authority, to an end user browser when the end user logs in to the Authentication Authority to begin an Authenticated Domains session. The Authentication Authority can perform checks and scans of the end user browser before downloading the "clientless" Client Verifier. The Authentication Authority can verify that the end user is who they say they are, that the end user has certain access rights to specific content called by Authenticated Domains or that the browser is free of malware, cached data or executables or other security threats prior to downloading the "clientless" Client Verifier. The Authentication Authority can remove all or specific traces of the "clientless" Client Verifier or data or executables created by an Authenticated Domains session, at the end of the session. It should be understood that the Authentication Authority system can be configured to revoke an authentication at any time by informing the client verifier that a particular domain is no longer authenticated. The Authentication Authority system can also change its databases at any time to prevent any further authentications for a particular domain for any reason.

It will be apparent to those having skill in the art that many changes may be made to the details of the above-described embodiments without departing from the underlying principles of the invention. The scope of the present invention should, therefore, be determined only by the following claims.

Most of the equipment discussed above comprises hardware and associated software. For example, the equipment is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A system, comprising:
a user terminal including a processor and a memory storing first domain name stub resolver instructions and second Domain Name Service (DNS) verifier instructions;
wherein the first domain name stub resolver instructions are executable by the processor to:
determine whether a local cache of the user terminal includes a translation for a DNS portion of a Uniform Resource Identifier (URI) of a network call;
responsive to determining that the local cache does not include the translation, send by the user terminal a transmission to a DNS server; and
responsive to determining that the local cache does include the translation or sending the transmission, obtain a domain name to IP address translation;
wherein the second DNS verifier instructions are executable by the processor to:
identify when the processor is provided with a domain name to IP look up request;
responsive to an identification, obtain an IP address from a predetermined remote service that incorporates a public key infrastructure (PKI);
compare the domain name to IP address translation obtained by the processor responsive to execution of the first domain name stub resolver instructions to the IP address obtained from the predetermined remote service;
determine whether to identify a mismatch exception responsive to a result of the comparison; and
responsive to identifying the mismatch exception, force a DNS cache of the user terminal to be dumped.

2. The system of claim 1, wherein the second DNS verifier instructions are further executable by the processor to repeat the determining corresponding the first domain name stub resolver instructions and the obtaining corresponding the first domain name stub resolver instructions after the dump.

3. The system of claim 2, wherein the second DNS verifier instructions are further executable by the processor to:
compare a next domain name to IP address translation obtained by the processor responsive to the execution of the first domain name stub resolver instructions to the IP address obtained from the predetermined remote service; and
in response to observing a same mismatch of the next domain name to IP address translation and the IP address obtained from the predetermined remote service as a mismatch corresponding to the mismatch exception, generate an error.

4. The system of claim 1, wherein the second DNS verifier instructions are further executable by the processor to:
responsive to identifying the mismatch exception, enable a cacheless DNS checking mode;
cause the processor to obtain a next domain name to IP address translation after the enabling.

5. The system of claim 4, wherein the second DNS verifier instructions are further executable by the processor to:
compare the next domain name to IP address translation obtained by the processor responsive to the execution of the first domain name stub resolver instructions to the IP address obtained from the predetermined remote service; and
in response to observing a same mismatch of the next domain name to IP address translation and the IP address obtained from the predetermined remote service as a mismatch corresponding to the mismatch exception, generate an error.

6. The system of claim 1, wherein the second DNS verifier instructions are further executable by the processor to:
in response to determining to not identify the mismatch exception, determine whether an initiation of a download of content corresponding to the domain name to IP address translation has been deferred or a downloaded portion of the content has been embargoed; and
responsive to determining that the initiation has been deferred or the downloaded portion has been embargoed, initiate the download or release the embargo responsive to a result of the comparison.

7. A method, comprising:
determining by a domain name stub resolver component of a user terminal whether a local cache of the user terminal includes a translation for a Domain Name Service (DNS) portion of a Uniform Resource Identifier (URI) of a network call;
responsive to determining that the local cache does not include the translation, generating by the domain name stub resolver component a transmission addressed to a DNS server; and
responsive to determining that the local cache does include the translation or sending the generated transmission, obtaining by the domain name stub resolver component a domain name to IP address translation;
identifying when the domain name stub resolver component is provided with a domain name to IP look up request;
responsive to an identification, obtaining an IP address from a predetermined remote service that incorporates a public key infrastructure (PKI);
comparing the domain name to IP address translation to the IP address obtained from the predetermined remote service; and
identifying a mismatch exception responsive to a result of the comparison; and
responsive to identifying the mismatch exception, forcing a DNS cache of the user terminal to be dumped.

8. The method of claim 7, further comprising
causing the domain name stub resolver component to repeat the determining and the obtaining after the dump.

9. The method of claim 8, further comprising:
comparing a next domain name to IP address translation obtained by the domain name stub resolver component to the IP address obtained from the predetermined remote service; and
in response to observing a same mismatch of the next domain name to IP address translation and the IP address obtained from the predetermined remote service as a previous mismatch corresponding to the mismatch exception, generating an error.

10. The method of claim 7, further comprising:
responsive to identifying the mismatch exception, enabling a cacheless DNS checking mode;
causing the domain name stub resolver component to obtain a next domain name to IP address translation after the enabling.

11. The method of claim 10, further comprising:
comparing the next domain name to IP address translation obtained by the domain name stub resolver component to the IP address obtained from the predetermined remote service; and
in response to observing a same mismatch of the next domain name to IP address translation and the IP address obtained from the predetermined remote service as a mismatch corresponding to the mismatch exception, generating an error.

12. The method of claim 7, further comprising:
in response to determining to not identify the mismatch exception, determining whether an initiation of a download of content corresponding to the domain name to IP address translation has been deferred; and
responsive to determining that the initiation has been deferred, initiating the download responsive to a result of the comparison.

13. The method of claim 7, further comprising:
in response to determining to not identify the mismatch exception, determining whether an initiation of a downloaded portion of content corresponding to the domain has been embargoed; and
responsive to determining that the downloaded portion has been embargoed, releasing the embargo responsive to a result of the comparison.

14. An apparatus, comprising:
a memory comprising:
  a user terminal application; and
  a local cache to store translation data generated by operation of said user terminal application in communication with one or more remote Domain Name Service (DNS) servers over a first channel; and
a processor configured to access a predetermined remote service that incorporates a public key infrastructure (PKI), said access over a second channel that is different than the first channel; and
the processor configured to access the local cache, the processor to determine whether to identify a mismatch exception based on a result of the access of the local cache and using an IP address obtained from said predetermined remote service;
wherein the processor is further configured to:
  determine whether the translation data includes a translation associated with a network call, wherein the translation comprises a DNS portion of a Uniform Resource Identifier (URI) of the network call;
  responsive to determining that the translation data does not include the translation, perform first operations including:
    send, over the first channel, a transmission to the one or more remote DNS servers to obtain a first domain name to IP address translation;
    compare the first domain name to IP address translation to the IP address obtained over the second channel; and
    identify the mismatch exception responsive to a result of the comparison of the first domain name to IP address translation and the IP address obtained over the second channel; and
  responsive to determining that the translation data includes the translation, wherein the translation comprises a second domain name to IP address translation, perform second operations including:
    compare the second domain name to IP address translation to the IP address obtained over the second channel; and
    identify the mismatch exception responsive to a result of the comparison of the second domain name to IP address translation and the IP address obtained over the second channel; and
  responsive to identifying the mismatch exception, force a DNS cache of the user terminal to be dumped.

15. The apparatus of claim 14, wherein the processor is further configured to:
responsive to identifying the mismatch exception based on the result of the comparison of the second domain name to IP address translation and the IP address obtained over the second channel, obtain a next domain name to IP address translation from the one or more DNS servers over the first channel for comparison to the IP address obtained over the second channel; and
in response to observing a same mismatch of the next domain name to IP address translation and the IP address as a mismatch corresponding to the mismatch exception, generate an error.

16. The apparatus of claim 14, wherein the processor is further configured to:
enable a cacheless DNS checking mode;
obtain a next domain name to IP address translation from the one or more DNS servers over the first channel for comparison to the IP address obtained over the second channel using the cacheless DNS checking mode; and
in response to observing a same mismatch of the next domain name to IP address translation and the IP address as a mismatch corresponding to the mismatch exception, generate an error.

17. The apparatus of claim 14, wherein the processor is further configured to:
in response to determining to not identify the mismatch exception, determine whether a downloaded portion of content corresponding to at least one of the domain name to IP address translations has been embargoed; and
responsive to determining that the downloaded portion of the content has been embargoed, release the embargo.

18. The apparatus of claim 14, wherein the second channel comprises a secure channel associated with a restricted DNS that is different than any DNS corresponding to the one or more DNS servers.

* * * * *